United States Patent
Yang et al.

(10) Patent No.: US 12,243,046 B1
(45) Date of Patent: Mar. 4, 2025

(54) SYSTEMS AND METHODS FOR ENABLING CUSTOMIZED DIGITAL OBJECTS IN MULTIPLE ENVIRONMENTS

(71) Applicant: Wells Fargo Bank, N.A., San Francisco, CA (US)

(72) Inventors: Young M. Yang, San Francisco, CA (US); Eric J. Miller, Burlingame, CA (US); Jenny Y. Tao, Belmont, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 88 days.

(21) Appl. No.: 17/828,537

(22) Filed: May 31, 2022

(51) Int. Cl.
  *G06Q 20/34* (2012.01)
  *G06Q 20/12* (2012.01)
  *G06Q 20/38* (2012.01)

(52) U.S. Cl.
  CPC ......... *G06Q 20/355* (2013.01); *G06Q 20/123* (2013.01); *G06Q 20/3821* (2013.01)

(58) Field of Classification Search
  CPC .................................................. G06Q 20/355
  USPC ........................................................ 235/380
  See application file for complete search history.

(56) References Cited

U.S. PATENT DOCUMENTS

| | | | |
|---|---|---|---|
| 9,514,359 B2 | 12/2016 | Mitchell et al. | |
| 10,380,583 B1 | 8/2019 | Ellis et al. | |
| 10,417,636 B2 | 9/2019 | Pareek et al. | |
| 10,726,401 B2 | 7/2020 | Hertel et al. | |
| 10,825,001 B2 | 11/2020 | Purves et al. | |
| 2022/0075845 A1* | 3/2022 | Bowen | G06F 30/30 |

* cited by examiner

*Primary Examiner* — Rafferty D Kelly
(74) *Attorney, Agent, or Firm* — Foley & Lardner LLP

(57) ABSTRACT

Systems and methods of enabling and providing digital objects across multiple environments are provided. A computer-implemented method includes: receiving, by a provider institution computing system, a request to associate a card with a digital object; generating, by the provider institution computing system, at least one filter that defines prohibited content for card images; extracting, by the provider institution computing system, image content from the digital object; determining, by the provider institution computing system, that the image content satisfies the filter; associating, by the provider institution computing system, the digital object with the card in a database of the provider institution computing system; and causing, by the provider institution computing system, a provisioning of the digital object associated with the card to a provider institution client application associated with the provider institution to display the digital object as being associated with the card.

18 Claims, 7 Drawing Sheets

SYSTEMS AND METHODS FOR ENABLING CUSTOMIZED DIGITAL OBJECTS IN MULTIPLE ENVIRONMENTS

TECHNICAL FIELD

Embodiments and aspects of the present disclosure relate to the field of enabling and providing digital objects across multiple environments.

BACKGROUND

Payments for products and services are often completed using credit cards, debit cards, checks, and/or cash. Credit cards and debit cards are issued with a generic image on the face of the physical card. However, there are many instances where a user finds it desirable to customize the image on the physical card with a specific image selected by and/or provided by the user. Using a custom card image may aid the user in identifying the card they wish to use, add intrinsic value to the card, and separate the card from other cards with generic images.

Additionally, many people carry some type of mobile device. Electronic-based transactions may be carried out using a mobile device that incorporates an application or program allowing individuals to make payments to merchants using the mobile device instead of a physical card. Such applications may include digital representations of their physical transaction cards for transactions. Keeping track of which physical card is associated with which digital representation may be cumbersome as the number of cards in today's environment has proliferated.

SUMMARY

One example embodiment relates to a computer-implemented method. The computer-implemented method includes: receiving, by a provider institution computing system, a request to associate a card with a digital object; generating, by the provider institution computing system, at least one filter that defines prohibited content for card images, the at least one filter comprising a first filter; extracting, by the provider institution computing system, image content from the digital object; determining, by the provider institution computing system, that the image content satisfies the first filter; in response to the determination that the image content satisfies the first filter, associating, by the provider institution computing system, the digital object with the card in a database of the provider institution computing system; and causing, by the provider institution computing system, a provisioning of the digital object associated with the card to a provider institution client application associated with the provider institution to display the digital object as being associated with the card.

Another example embodiment relates to a non-transitory computer-readable medium having instructions stored thereon that, when executed by a processor of a provider institution computing system, cause various operations. The operations include: receiving a request to associate a card with a digital object; generating at least one filter that defines prohibited content for card images, the at least one filter comprising a first filter; extracting image content from the digital object; determining that the image content satisfies the first filter; in response to the determination that the image content satisfies the first filter, associating the digital object with the card in a database associated with the provider institution computing system; and causing a provisioning of the digital object associated with the card to a client application associated with the provider institution computing system to display the digital object as being associated with the card.

A further example embodiment relates to a mobile device. The mobile device includes a processor and a memory coupled to the processor, the memory having a provider institution client application stored thereon, the provider institution client application including instructions executable by the processor to: receive a request to associate a card with a digital object; generate at least one filter that defines prohibited content for card images, the at least one filter comprising a first filter; extract image content from the digital object; determine that the image content satisfies the first filter; in response to the determination that the image content satisfies the first filter, associate the digital object with the card in a database associated with the provider institution client application; and cause a provisioning of the digital object associated with the card to the provider institution client application to display the digital object as being associated with the card.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementation.

BRIEF DESCRIPTION OF THE FIGURES

The details of one or more implementations are set forth in the accompanying figures and the description below. Other features, aspects, and advantages of the disclosure will become apparent from the description, the drawings, and the claims, in which:

DETAILED DESCRIPTION

Figure 1:
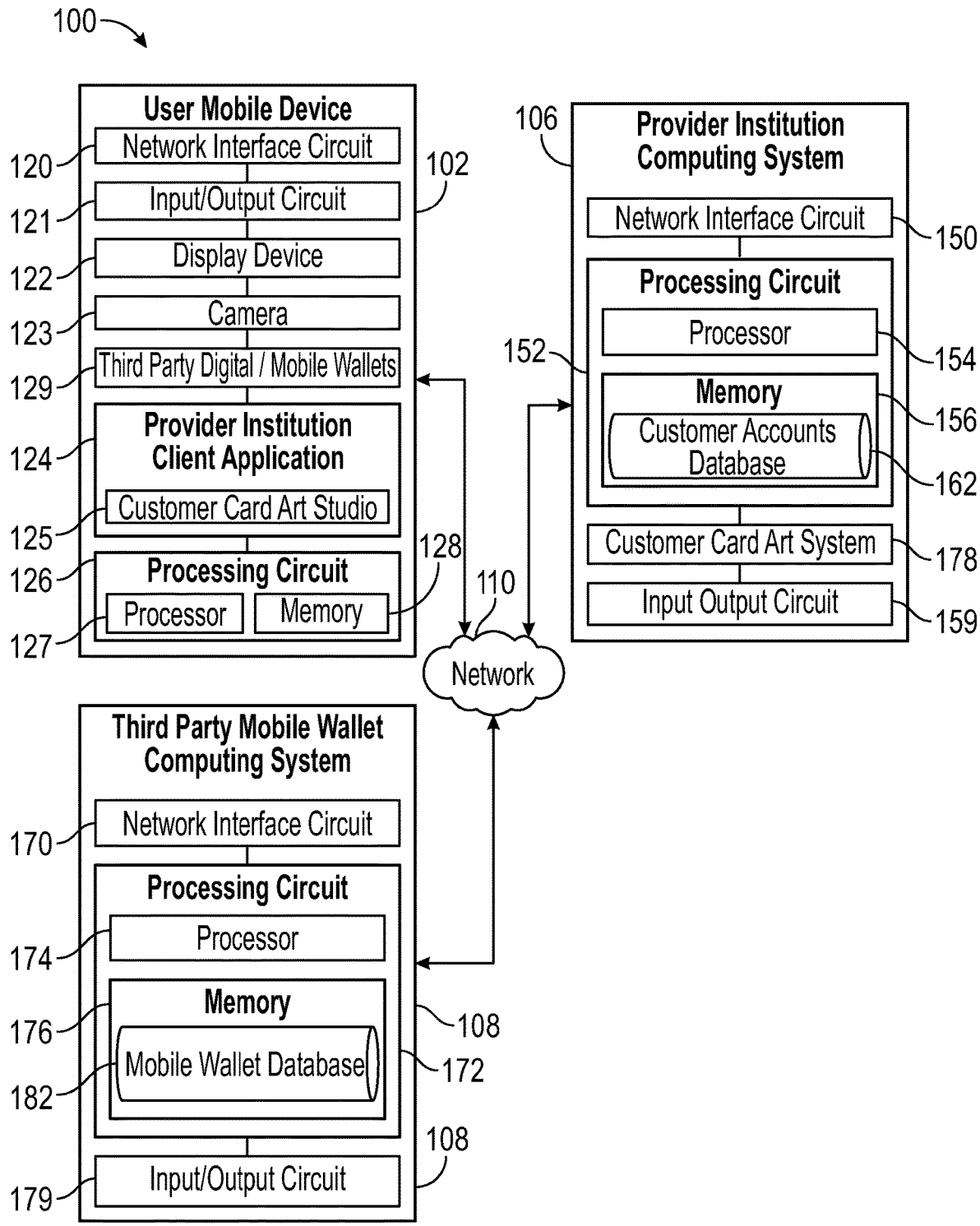
FIG. 1 is a computing system configured to enable receiving and providing custom digital objects, such as custom card art, across multiple digital platforms, according to an exemplary embodiment.

Referring generally to the Figures, systems, apparatuses, and methods for enabling digital objects to be provided across various physical and digital platforms are disclosed according to various embodiments herein. More particularly, the systems and methods described herein relate to enabling the provisioning of custom card art to represent an associated card, such as a transaction card (e.g., a credit card), across multiple digital platforms and/or on physical cards.

In various embodiments, a mobile device of a user may be used to access a client application associated with a provider institution, where the client application provides access to an account of the user (e.g., customer account). The provider institution client application may include payment capabilities, such as the ability to use a communication protocol (e.g., near-field communication) at a point-of-sale terminal to transfer payment information associated with the account to a merchant to enable the purchase of a good or service. In an example illustrative scenario, a user may provide the provider institution client application with the digital object (e.g., custom card art) that the user desires to display in association with a transaction card (e.g., upload a desired image or GIF to be associated with one or more desired transaction cards). The user may initiate this process via a custom card art studio circuit of the provider institution client application or via a provider institution website provided by a provider institution computing system. The user may identify which one or more transaction cards depicted in or otherwise linked with the provider institution client application that the user desires to be associated with the digital object. The provider institution client application may transmit this information to the provider institution computing system that supports the client application. In some embodiments, the provider institution computing system may identify third party accounts (third party wallets, third party digital platforms such as websites, etc.) that are applicable with the one or more transaction cards. The provider institution computing system may perform one or more filter processes to determine an acceptability or compatibility of the digital object with the identified third party accounts (i.e., the third party digital platforms and/or associated physical cards). If the received digital object satisfies the filter, which may be specific to the provider institution and/or the third party, the provider institution computing system then provisions the digital object to the third party account such that the digital object is depicted in the third party account as being associated with a transaction card shown in the third party account. If the received digital object does not satisfy the filter, the provider institution client application may provide a notification to the user regarding the refusal and prompt the user to upload a new object. Advantageously, the desired digital object may in turn be depicted across multiple disparate platforms (e.g., websites, mobile wallets, on physical cards, etc.) so that the user may readily identify their card in a relatively quick manner.

Technically and beneficially, the systems, methods, and apparatuses enable a digital object to be associated with a transaction card and digitally represented across multiple separate platforms. This enables the same representation to be reflected in various environments, which enables users to quickly identify associated cards. The provider institution client application described herein therefore beneficially provides a single interface that syncs with multiple third parties to enable digital object updates (e.g., changes to depicted card art, etc.) to be accomplished across the multiple third party platforms. Typically, third party digital platforms may not allow changes to card art depictions. A single interface that enables card art changes across multiple disparate system represents a technical improvement in processing requirements (i.e., reduces overall processing power) as a user need not visit each and every disparate system to enable digital object updates across multiple systems. Moreover and as will be described herein in more detail, the systems, methods, and apparatuses enable the various requirements associated with acceptable depicted content for each third party digital platform to be taken into consideration in order to provide the digital object across multiple platforms. Furthermore and given the single interface of the provider institution client application, instances of the card are centrally managed thereby enabling a consistent display of the digital object across various platforms (e.g., a providing institution, a third party platform, etc.). In practical application, the single interface of the provider institution client application enables the number of inputs (e.g., clicks, etc.) to be greatly reduced compared to if a user attempted to change the depicted digital object (e.g., card art) in each platform that depicts the digital object. These and other feature and benefits are described more fully herein below.

As used herein, the term "transaction card" refers to cards that may enable a transaction, where the transaction may include or not include the exchange of payment information. Thus, a "transaction card" may include payment vehicles associated with an account (e.g., credit cards, debit cards, gift cards/stored value cards, etc.) and other cards (e.g., loyalty cards, boarding passes, coupons, and the like). Each of these transaction cards may be represented by a digital object in a digital platform. The term "digital object" therefore refers to a file or files that may be associated with a transaction card for digital display with the transaction card (e.g., an image, a picture, an illustration, a photo, etc.). The digital object may represent artwork chosen by a user, such as images of locations, family photos, and so on. The digital object may be associated with one or more transaction cards and, in turn, depicted on a physical and/or digital representation of the card (i.e., a custom card image).

Before turning to the Figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring now to FIG. 1, a system 100 for providing digital objects (such as custom card art, which may be in the form of static or dynamic images, such as a GIF) that associate with one or more transaction cards of a user is shown, according to an example embodiment. The system 100 includes a user mobile device 102, a provider institution computing system 106, and a third party computing system 108 coupled by a network 110. The network 110 may include one or more of the Internet, cellular network, Wi-Fi®, Wi-Max, a proprietary banking network, or any other type of wired or wireless network or a combination of wired and wireless networks.

The user mobile device 102 may include any type of mobile device owned by, associated with, managed by, or otherwise operated by a user. As such, the user mobile device 102 includes, but is not limited to, a phone (e.g., a smartphone), a mobile computing device (e.g., a tablet computer, a laptop computer, a personal digital assistant, etc.), a wearable device (e.g., a smart watch, smart glasses, a smart bracelet, etc.), and so on. In some embodiments, the device may be a stationary computing device, such as a desktop computer that is coupled to the network 110. Thus, the term "mobile" is not meant to be limiting to reflect a user computing device. The user may be an individual, business representative, large and small business owner, and so on. The user may be an existing client or a new client to a provider institution associated with the provider institution computing system 106.

The user mobile device 102 includes a network interface circuit 120, an input/output circuit 121, a display device 122, a camera 123, a processing circuit 126, the provider institution client application 124, and third party digital/mobile wallets (e.g., application(s)) 129. The network interface circuit 120 is configured or structured to establish connections via the network 110 between the user mobile device 102 and the provider institution computing system 106, and/or the third party computing system 108. The processing circuit 126 includes a processor 127, a memory 128, and may be communicably coupled to the provider institution client application 124.

In some embodiments, the network interface circuit 120 may include one or more antennas or transceivers and associated communications hardware and logic (e.g., computer code, instructions, etc.). The network interface circuit 120 may also include program logic that is structured to allow the user mobile device 102 to access and couple/connect to the network 110 to, in turn, exchange information with for example the provider institution computing system 106 and/or the third party computing system 108 (and potentially other systems/devices). That is, the network interface circuit 120 is coupled to the processor 127 and memory 128 and configured to enable a coupling to the network 110. The network interface circuit 120 allows for the user mobile device 102 to transmit and receive data over the network 110. Accordingly, the network interface circuit 120 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver and a wireless transceiver). Thus, the network interface circuit 120 enables connectivity to WAN as well as LAN (e.g., Bluetooth, near field communication (NFC), etc. transceivers). Further, in some embodiments, the network interface circuit 120 includes cryptography capabilities to establish a secure or relatively secure communication session between other systems such as the provider institution computing system 106, a second mobile device, the third party computing system 108, etc. In this regard, information (e.g., account information, login information, financial data, digital objects, and/or other types of data) may be encrypted and transmitted to prevent or substantially prevent a threat of hacking or other security breach. To further support features of or interaction with the user mobile device 102, the network interface circuit 120 may provide a relatively high-speed link to the network 110.

The input/output circuit 121 is structured to receive communications from and provide communications to a user of the user mobile device 102. In this regard, the input/output circuit 121 is structured to exchange data, communications, instructions, etc. with an input/output component of the user mobile device 102. The input/output circuit 121 includes hardware and associated logic (e.g., instructions, computer code, etc.) to enable the user mobile device 102 to exchange information with a user and other devices (e.g., the provider institution computing system 106) that may interact with the user mobile device 102. In some embodiments, the input aspect of the input/output circuit 121 allows the user to input or provide information into the user mobile device 102 and may include machine-readable media for facilitating the exchange of information between the input/output device and the components of the user mobile device 102. The input/output circuit 121 may include any combination of hardware components, for example, a mechanical keyboard, a touchscreen, a microphone, a camera (e.g., camera 123), a fingerprint scanner, a device that is able to be coupled to the user mobile device 102 via a connection (e.g., USB, serial cable, Ethernet cable, etc.), and so on. The output aspect of the input/output circuit 121 allows the user to receive information from the user mobile device 102, and may include, for example, a digital display, a speaker, illuminating icons, light emitting diodes ("LEDs"), and so on. Thus, the input/output circuit 121 may include systems, components, devices, and apparatuses that serve both input and output functions; only input functions; and/or only output functions. Such systems, components, devices and apparatuses may include, for example, radio frequency ("RF") transceivers, near-field communication ("NFC") transceivers, and other short range wireless transceivers (e.g., Bluetooth©, laser-based data transmitters, etc.). The input/output circuit 121 may include communication circuitry for facilitating the exchange of data, values, messages, and the like between an input and/or output device and the components of the user mobile device 102.

In some embodiments, the display device 122 may be a screen, such as a touchscreen or another display device. The user mobile device 102 may communicate information to the user via the display device 122 and/or to receive communications from the user (e.g., through a keyboard provided on the display device 122. In some embodiments, the display device 122 may be a component of the input/output circuit 121, as described above.

In some embodiments, the user mobile device 102 may generate and/or receive and present various display screens that include account information, transaction instructions, account management options, and/or so on. The various display screens may be accessed via the provider institution client application 124. In some embodiments, a display screen may be used to request authentication information from the user. Authentication information may be used to unlock the mobile device and/or open up and use provider institution client application 124. Thus, authentication information may include, but is not limited to, a credential (e.g., username and password information for the client application), biometric information (e.g., face scan, retina scan, fingerprint, etc.) for unlocking the user mobile device 102 and accessing the provider institution client application 124, and so on. As described herein and in some embodiments, display screens may be generated by the provider institution client application 124 to perform certain digital object processes.

The third party digital/mobile wallets 129 are applications installed on the user mobile device 102. The third party digital/mobile wallets 129 may be supported by a third-party institution associated with the third party computing system 108 (or other third parties relative to the provider institution associated with the provider institution computing system 106). The third party digital/mobile wallets 129 may be hard coded into the memory 128 of the processing circuit or downloaded for execution (e.g., from an app store).

The third party digital/mobile wallets 129 are structured or configured to include a representation of a card associated with the user (e.g., a credit card, debit card, stored value card, identification card, etc.). Thus, the third party digital/mobile wallets 129 may include functionality that may be used to manage and/or use associated transaction cards. Third party digital/mobile wallets 129 may be structured as a single application or multiple applications. A user may register one or more cards with one or more of the third party digital/mobile wallets 129.

In some embodiments, a GUI generated and provided by the third party digital/mobile wallets 129 may be used to request authentication information from the user in order to access the third party digital/mobile wallets 129. Thus, authentication information may include, but is not limited to, a credential (e.g., username and password information for the client application), biometric information (e.g., face scan, retina scan, fingerprint, etc.) and other credentials stored by computing systems associated with such third party mobile wallets and platforms (e.g., the third party computing system 108). Such credentials may be transmitted from the user mobile device 102 to a third party computing system 108 to verify the credentials and complete the authentication process. Alternatively, such credentials may be transmitted to the provider institution computing system 106, which in turn transmits the credentials to the third party computing system 108. The third party computing system 108 may transmit a reply message to the provider institution computing system 106 to establish a "link" between the third party computing system 108 and the provider institution computing system 106. In various arrangements, a link between the provider institution computing system 106 and the third party computing system 108 may allow transfer of data objects, images, messages, and so on, in order to facilitate the provisioning of digital objects to third party digital/mobile wallets 129.

In certain embodiments, the third party digital/mobile wallets 129 may enable transactions at a point of a sale of a merchant (i.e., a payment-enabled third party wallet application). In one embodiment, the third party digital/mobile wallets 129 may be mobile wallets that are operable under a host card emulation (HCE) framework. In another embodiment, the mobile/digital wallets may be operable under a secure element framework. In yet another embodiment, the third party wallet or application is operable under a hybrid framework that utilizes aspects of a secure element framework and a HCE framework. In a secure element framework, the user mobile device 102 includes a secure element that is separate from the main system memory of the user mobile device 102 (e.g., any element having smart card functionalities, such as a universal subscriber identity circuit (a "SIM" card) or a secure digital card). Client account data for the user is stored in the secure element on the user mobile device 102. In an HCE framework, client account data is maintained within a cloud-based environment (e.g., a host emulation service or a mobile wallet database 182 of the third party computing system 108). The cloud-based environment then provisions tokens representing transaction card accounts the user has registered with the cloud-based environment to the third party digital/mobile wallets 129 on the user's mobile device (e.g., the user mobile device 102). The payment tokens are stored in the mobile device for a limited time until they expire, and then new payment tokens are provisioned to the mobile device. In various other arrangements, the user-specific payment information may be stored in a trusted execution environment ("TEE") within a processor of the user mobile device 102. The systems and methods disclosed herein may also be used with other modalities currently available for storage and transfer of user payment via contactless communication mechanisms. In operation, the third party wallets may transmit payment information (e.g., token, etc.) to a merchant point of sale via a short range wireless communication (e.g., NFC tap) and/or via an optical scanning means (e.g., barcode, QR code, etc.).

In some embodiments, the third party digital/mobile wallets 129 may enable purchases or other transactions online (e.g., via a web browser). In these instances, digital objects associated with the user's transaction card may be depicted to signify the transaction card-on-file for the transaction (e.g., via an online marketplace, etc.).

Thus, and depending on the structure/configuration, the third party digital/mobile wallets 129 may enable mobile wallet transactions, online transactions, certain account management options (e.g., account balance viewing), a combination thereof, and so on. Therefore, the description of a third party wallet or application is meant to encompass applications that may enable merchant point-of-sale functions, applications that enable online purchases, and/or other applications that may provide a visual depiction in the form of a digital object associated with a transaction card of a user.

The provider institution client application 124 is communicably coupled to the provider institution computing system 106 and may perform certain operations described herein, such as facilitating a provisioning a digital object to one or more platforms (e.g., third party digital/mobile wallets 129) that depict one or more transaction cards. In some embodiments, the provider institution client application 124 is configured to interface with the provider institution computing system 106 to allow a user to manage the user's client account, including the user's transaction cards linked or otherwise associated therewith. For example, the provider institution client application 124 may facilitate the user in registering one or more transaction cards to an associated client account linked to the provider institution client application 124, enable transactions, view account balances, activate/deactivate a transaction card, make modifications to account information associated with the transaction card (e.g., name, address, etc.), and so on. Accordingly, in various arrangements, the provider institution client application 124 is communicably coupled via the network interface circuit 120 to the provider institution computing system 106 and/or the third party computing system 108.

In some embodiments, the provider institution client application 124 may be structured to generate and present displays or graphical user interfaces on the user mobile device 102. For example, the provider institution client application 124 may enable the user to input information pertaining to creating and managing the user's account with the provider institution, uploading digital objects, and transmitting the digital objects to the provider institution computing system 106 or elsewhere. The provider institution client application 124 may also be used to perform other managerial operations related to the user's account with the provider institution. The provider institution client application 124 may communicate with the input/output circuit 121 and/or the display device 122 to perform such tasks.

The provider institution client application 124 may be structured to provide a user with access to a variety of account management activities. In the example shown, the provider institution client application 124 is a financial institution application that is at least partly supported by the provider institution computing system 106. Thus, the provider institution client application 124 may be a financial services application (e.g., mobile banking), which enables a user to view, access, and manage accounts held by the provider institution (e.g., checking and/or savings account, mortgage account, brokerage account, and so on).

In some arrangements, the user may only access the provider institution client application 124 upon providing requisite authentication information, such as username and password information, biometric information, etc. In this way, the user's access to and use of the provider institution client application 124 is conditioned upon the user's authentication, which may require the user to register for an account. In some embodiments, the user may be required to create a user client application account and/or register in order to access to the provider institution client application 124, which may further require the user to be user of the provider institution. Upon receiving requisite authentication information, the provider institution client application 124 may be structured to initiate an authenticated session, whereupon the user may have access to the functionality of the provider institution client application 124. The "authenticated session" refers to a usage session of the provider institution client application 124 following authentication of the user into the provider institution client application 124. The authenticated session may expire after a certain duration of time with or without action of the user related to the provider institution client application 124. The provider institution client application 124 may be structured to prompt the user to provide authentication information in the event the authenticated session expires.

In some embodiments, the provider institution client application 124 includes program logic stored in a system memory of the user mobile device 102. In such arrangements, the program logic may configure a processor of the user mobile device 102 to perform at least some of the functions discussed herein with respect to the provider institution client application 124 of the user mobile device 102. For example and in the embodiment depicted, the provider institution client application 124 may be downloaded from an app store, stored in the memory 128, and selectively executed by the processor 127. In other embodiments, the provider institution client application 124 may be hard-coded into the user mobile device 102. In some embodiments, the provider institution client application 124 is a web-based application. Additionally, as will be understood, the level of functionality that resides on the user mobile device 102 versus the provider institution computing system 106 will vary depending on the implementation.

As described above, the provider institution client application 124 is structured to enable the user to manage his/her account. In this regard, the provider institution client application 124 is structured to generate and present GUIs that may enable the user to manually input information (e.g., a PIN, a primary account number ("PAN"), etc.) pertaining to a transaction card or enable the user to take a picture of a transaction card. The provider institution client application 124 may then process the information input by the user, identify account information, and transmit the information to the provider institution computing system 106 for storage (e.g., in the customer accounts database 162 in association with the user). In some embodiments, the provider institution client application 124 is structured to permit, enable, facilitate, manage, process, and otherwise allow client account transactions (e.g., bill payments). In this regard, the provider institution client application 124 may store information relating to various items, such as transaction cards and digital objects associated with the transaction cards (e.g., digital objects provisioned via the customer card art studio 125). In some embodiments, such information is stored in the memory 128. In other embodiments, such information is stored in the customer accounts database 162 of the provider institution computing system 106.

In some embodiments, the provider institution client application 124 is structured to permit the user to engage in client account transactions. As used herein, the term "client account transaction" is meant to be broadly interpreted to refer to transactions accomplished via the provider institution client application 124 on the user mobile device 102. As such, a client account transaction may include, but is not limited to, a person-to-person payment, a payment for a good or service at a point-of-sale terminal of a merchant, and the like. A client account transaction may also include a non-payment transaction, such as transmitting ticket information to a third party device. In some arrangements, the provider institution client application 124 engages in client account transactions through the initiation of communications with, for example, a merchant point-of-sale device. In this regard, the user mobile device 102 may include an NFC chip and an associated controller that configures the chip to exchange information with the merchant point-of-sale device (e.g., an NFC reader). The provider institution client application 124 may thus transmit payment information to the merchant point-of-sale device using the NFC chip and associated controller. In other arrangements, the provider institution client application 124 engages in client account transactions through the display device 122. For example, the user mobile device 102 may display a Quick Response Code ("QR code") for a ticket on the display device 122 such that a third party can scan the QR code. In other embodiments, certain ones of these features are excluded from the provider institution client application 124 and instead included with the third party digital/mobile wallets 129 or excluded entirely.

In some embodiments, the provider institution client application 124 is also configured to generate and present displays that enable the user to perform actions with transaction cards. In various embodiments, the provider institution client application 124 presents displays enabling the user to select a transaction card for a transaction. Moreover, in some embodiments, the provider institution client application 124 may enable the user to perform various other actions using a selected transaction card (e.g., manage an account associated with the selected transaction card, view a transaction history associated with the selected transaction card, and the like). In some embodiments, the provider institution client application 124 is also configured present displays that enable the user to provision various digital items (e.g., images) to represent various transaction cards.

As shown, the provider institution client application 124 includes a customer card art studio (or circuit) 125. The customer card art studio 125 may be accessed by the user while operating the provider institution client application 124. The customer card art studio 125 may allow the user to manage one or more digital objects that may be provisioned as a representation of one or more of the user's transaction cards populated in the provider institution client application 124 and across various other platforms (e.g., third party digital/mobile wallets 129). The customer card art studio 125 may provide the provider institution computing system 106 with one or more digital objects for storage in the customer accounts database 162.

It is to be understood that while the customer card art studio 125 has been shown as being part of the provider institution client application 124, in other embodiments, the customer card art studio 125 may be a separate stand-alone application, which may be downloaded from an app stored, stored in the user device memory and executable by a processor of the user device, a combination thereof, etc. In the example shown, the customer card art studio 125 is included in the provider institution client application and, as such, the customer card art studio 125 may be embodied as one or more modules (e.g., program logic) that enable certain processes described herein.

As shown, the provider institution computing system 106 includes a network interface circuit 150, a processing circuit 152, and an input/output circuit 159. The provider institution computing system 106 is a computing system associated with a provider institution. The provider institution computing system 106 may maintain a plurality of user accounts having various information. The provider institution may include commercial or private banks, credit unions, investment brokerages, other financial institutions, etc. In the example shown, the provider institution is an issuer of a transaction card of the user. In the example shown, the provider institution computing system 106 is structured as a backend computing system that may comprise one or more servers.

The network interface circuit 150 is structured to couple to the network to enable communications with the third party computing system 108 and the user mobile device 102, among potentially other systems and devices. In some embodiments, the network interface circuit 150 includes programming and/or hardware-based components that connect the provider institution computing system 106 to the network 110. The network interface circuit 150 may be coupled to the processing circuit 152 in order to enable the processing circuit 152 to receiving and transmit messages, data, and information via the network 110. In some embodiments, the network interface circuit 150 may include one or more antennas or transceivers and associated communications hardware and logic (e.g., computer code, instructions, etc.). The network interface circuit 150 may also include program logic that is structured to allow the provider institution computing system 106 to access and couple/connect to the network 110 to, in turn, exchange information with for example the user mobile device 102 and/or the third party computing system 108 (and potentially other systems/devices). That is, the network interface circuit 150 is coupled to the processor 154 and memory 156 and configured to enable a coupling to the network 110. The network interface circuit 150 allows for the provider institution computing system 106 to transmit and receive data over the network 110. Accordingly, the network interface circuit 150 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver and a wireless transceiver). Thus, the network interface circuit 150 enables connectivity to WAN as well as LAN (e.g., Bluetooth, near field communication (NFC), etc. transceivers). Further, in some embodiments, the network interface circuit 150 includes cryptography capabilities to establish a secure or relatively secure communication session between other systems such as the user mobile device 102, a second mobile device, the third party computing system 108, etc. In this regard, information (e.g., account information, login information, financial data, digital objects, and/or other types of data) may be encrypted and transmitted to prevent or substantially prevent a threat of hacking or other security breach. To further support features of or interaction with the provider institution computing system 106, the network interface circuit 150 may provide a relatively high-speed link to the network 110.

The processing circuit 152 is shown to include a processor 154 and a memory 156, and may be communicably connected to the network interface circuit 150 and the input/output circuit 159. The memory 156 includes one or more memory devices (e.g., RAM, NVRAM, ROM, Flash Memory, hard disk storage) that store data and/or computer code for facilitating the various processes described herein. That is, in operation and use, the memory 156 stores at least portions of instructions and data for execution by the processor 154 to perform various operations. The memory 156 may be or include tangible, non-transient volatile memory and/or non-volatile memory. The processor 154 may be implemented as one or more processors, application specific integrated circuits (ASIC), one or more field programmable gate arrays (FPGAs), a digital signal processor (DSP), a group of processing components, or other suitable electronic processing components. The processing circuit 152 may include one or more processors 154 that are configured to communicate such that the processing circuit 152 may perform or assist in performing any of the operations, steps, or methods discussed herein.

The memory 156 may include a customer accounts database 162. The customer accounts database 162 is structured to retrievably store information regarding client accounts held by various users at the provider institution, such as a client account held by the user of the user mobile device 102. For instance, the customer accounts database 162 may store information related to the user and/or the user mobile device 102, such as authentication information (e.g., username/password combinations, device authentication tokens, security question answers, etc.), user information (e.g., name, date of birth, etc.), account information (e.g., account number, expiration date, etc.), and so on. The customer accounts database 162 may further store, in association with the user's client account, the user's transaction cards and associated digital objects. The customer accounts database 162 may store within the user's client account all or mostly all of the items that the user has registered with the provider institution computing system 106, including various transaction cards among other information. In various embodiments, the customer accounts database 162 is structured as one or more remote data-storage facilities (e.g., cloud servers).

The third party computing system 108 is structured to provide and support the third party digital/mobile wallets 129 on the user mobile device 102. The third party may be an institution that receives and/or interacts with transaction cards, such as a mobile wallet provider, a merchant, an application provider that stores the transaction card (e.g., a web browser provider), and so on. The term "third party" signifies that the entity/institution is a third party relative to the provider institution. The third party may own, manage, control, and/or is otherwise associated with the third party computing system 108. While the term "wallet" is shown in the Figures, this represents that the third party may be a wallet provider that supports (e.g., stores information regarding) one or more transaction cards of the user. In other embodiments and as alluded to above, the third party may not be a wallet provider but instead is otherwise associated with a transaction card of the user (e.g., a merchant). Thus, the third party computing system 108 may support and/or provide various digital platforms (e.g., mobile wallet, merchant application, internet browser, etc.) that, as described herein, may be updated to reflect (i.e., depict) received digital objects associated with transaction cards linked/associated with the digital platforms. The third party computing system 108 may be in communication (over the network 110) with the user mobile device 102 via the third party digital/mobile wallets 129 stored on the user mobile device 102 and the provider institution computing system 106. The third party computing system 108 includes a network interface circuit 170, a processing circuit 172, and an input/output circuit 179. The network interface circuit 170 is structured to establish connections/communications with the provider institution computing system 106 and the user mobile device 102 by way of the network 110.

In some embodiments, the network interface circuit 170 includes programming and/or hardware-based components that connect the third party computing system 108 to the network 110. In some embodiments, the network interface circuit 170 may be connected to the processing circuit 172 in order to enable the processing circuit 172 to receive and transmit messages, data, and information via the network 110.

The network interface circuit 170 is structured to couple to the network 110 to enable communications with the provider institution computing system 106 and the user mobile device 102, among potentially other systems and devices. In some embodiments, the network interface circuit 170 includes programming and/or hardware-based components that connect the third party computing system 108 to the network 110. The network interface circuit 170 may be coupled to the processing circuit 172 in order to enable the processing circuit 172 to receive and transmit messages, data, and information via the network 110. In some embodiments, the network interface circuit 170 may include one or more antennas or transceivers and associated communications hardware and logic (e.g., computer code, instructions, etc.). The network interface circuit 170 may also include program logic that is structured to allow the third party computing system 108 to access and couple/connect to the network 110 to, in turn, exchange information with for example the user mobile device 102 and/or the provider institution computing system 106 (and potentially other systems/devices). That is, the network interface circuit 150 is coupled to the processor 174 and memory 176 and configured to enable a coupling to the network 110. The network interface circuit 170 allows for the third party computing system 108 to transmit and receive data over the network 110. Accordingly, the network interface circuit 170 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver and a wireless transceiver). Thus, the network interface circuit 170 enables connectivity to WAN as well as LAN (e.g., Bluetooth, near field communication (NFC), etc. transceivers). Further, in some embodiments, the network interface circuit 170 includes cryptography capabilities to establish a secure or relatively secure communication session between other systems such as the user mobile device 102, a second mobile device, the provider institution computing system 106, etc. In this regard, information (e.g., account information, login information, financial data, digital objects, and/or other types of data) may be encrypted and transmitted to prevent or substantially prevent a threat of hacking or other security breach. To further support features of or interaction with the third party computing system 108, the network interface circuit 150 may provide a relatively high-speed link to the network 110.

The processing circuit 172 includes a processor 174 and a memory 176, and may be communicably connected to the network interface circuit 170, and the input/output circuit 179. Each of the network interface circuit 170 and input/output circuit 179 may include program logic that may be executed by the processor 174. The memory 176 may include or be communicatively coupled to a mobile wallet database 182. The mobile wallet database 182 may store information regarding the accounts of one or more users of the provided third party wallets, including information related to one or more transaction cards registered to a user's third party mobile wallet (e.g., digital objects associated with the transaction cards, etc.).

In some embodiments, the memory 176 may be configured and/or include similar components as that of the memory 156. That is, in operation and use, the memory 176 stores at least portions of instructions and data for execution by the processor 174 to control the processing circuit 172. The processing circuit 172 may include one or more processors 174 that are configured to communicate such that the processing circuit 172 may perform or assist in performing any of the operations, steps, or methods discussed herein. The processor 174 may be configured and/or include components similar to that of the processor 154.

Figure 2:
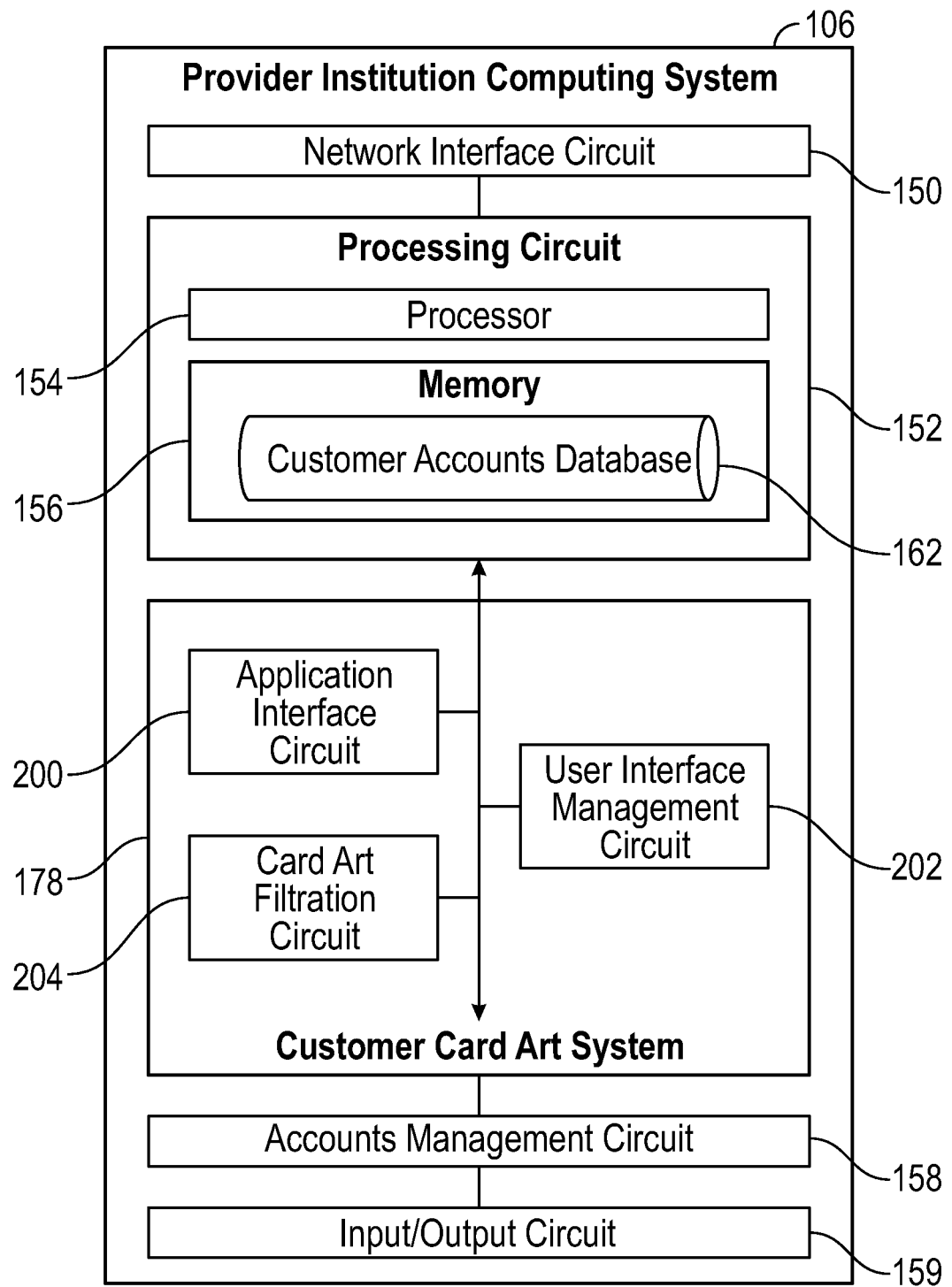
FIG. 2 is a detailed schematic diagram of a provider institution computing system of FIG. 1, according to an exemplary embodiment.

Referring now to FIG. 2, a more detailed view of the provider institution computing system 106 of the system 100 of FIG. 1 is shown, according to an example embodiment. As shown in FIG. 2, the provider institution computing system 106 includes a customer card art processing system or circuit 178. The customer card art processing system or circuit 178 may be coupled to and at least partly support the customer card art studio 125 of the provider institution client application 124. Thus, in some embodiments, some of the operations described with respect to the provider institution client application 124 (and, particularly, the customer card art studio 125) may be performed by the customer card art processing system or circuit 178 and vice versa. The customer card art processing system or circuit 178 is shown to include an application interface circuit 200, a user interface management circuit 202, and a card art filtration circuit 204. As shown, each of these circuits may be communicably and operatively coupled to each other and to the customer accounts database 162. However, other embodiments of the customer card art processing system or circuit 178 may include more or fewer circuits without departing from the spirit and scope of the present disclosure. Further, some embodiments of the customer card art system or circuit 178 may combine the activities of one circuit with another circuit to form a single circuit. Therefore, those of ordinary skill in the art will appreciate that the present arrangement is not meant to be limiting.

The application interface circuit 200 is structured or configured to facilitate a communicable link between the provider institution computing system 106 and various applications, such as the provider institution client application 124 and/or the third party digital/mobile wallets 129. For example, the application interface circuit 200 may be used to establish an API gateway between the provider institution computing system 106 and the provider institution client application 124 and/or the third party digital/mobile wallets 129 to send and receive data packages allowing for facilitate the functionalities of the applications described herein. Such functionalities may enable the provider institution computing system 106 to perform various operations with respect to transaction cards (e.g., manage digital objects, associate digital objects with transaction cards, manage an account maintained by the provider institution computing system 106, view an account balance, view a transaction history, and the like).

The user interface management circuit 202 is structured or configured to generate, modify, and update GUIs that may be provided to a user using the customer card art studio (e.g., via the provider institution client application 124 and/or via a website hosted by the provider institution computing system 106). In various arrangements, the user interface management circuit 202 updates the user GUIs responsive to user interactions with various portions of a GUI presented to a user, such as via the provider institution client application 124. In some arrangements, the user interface management circuit 202 further updates the GUIs viewable by the user responsive to information received from the user (e.g., user mobile device) and/or third party computing system. For example, in response to a request to associate a digital object with one or more transaction cards associated with the client account, the user interface management circuit 202 may generate one or more displays/GUIs that are provided via the user mobile device 102 (such as within the provider institution client application 124 or a website navigated to via a browser on the user mobile device 102).

The card art filtration circuit 204 is structured or configured to perform one or more filtering operations as part of the process of associating and/or provisioning digital objects to one or more transaction cards associated with a user. Such filtering operations may be responsive to receiving a digital object from a user via the customer card art studio 125 of the provider institution client application 124. The filtering operation(s) are described in more detail below in regards to FIG. 3.

Figure 3:
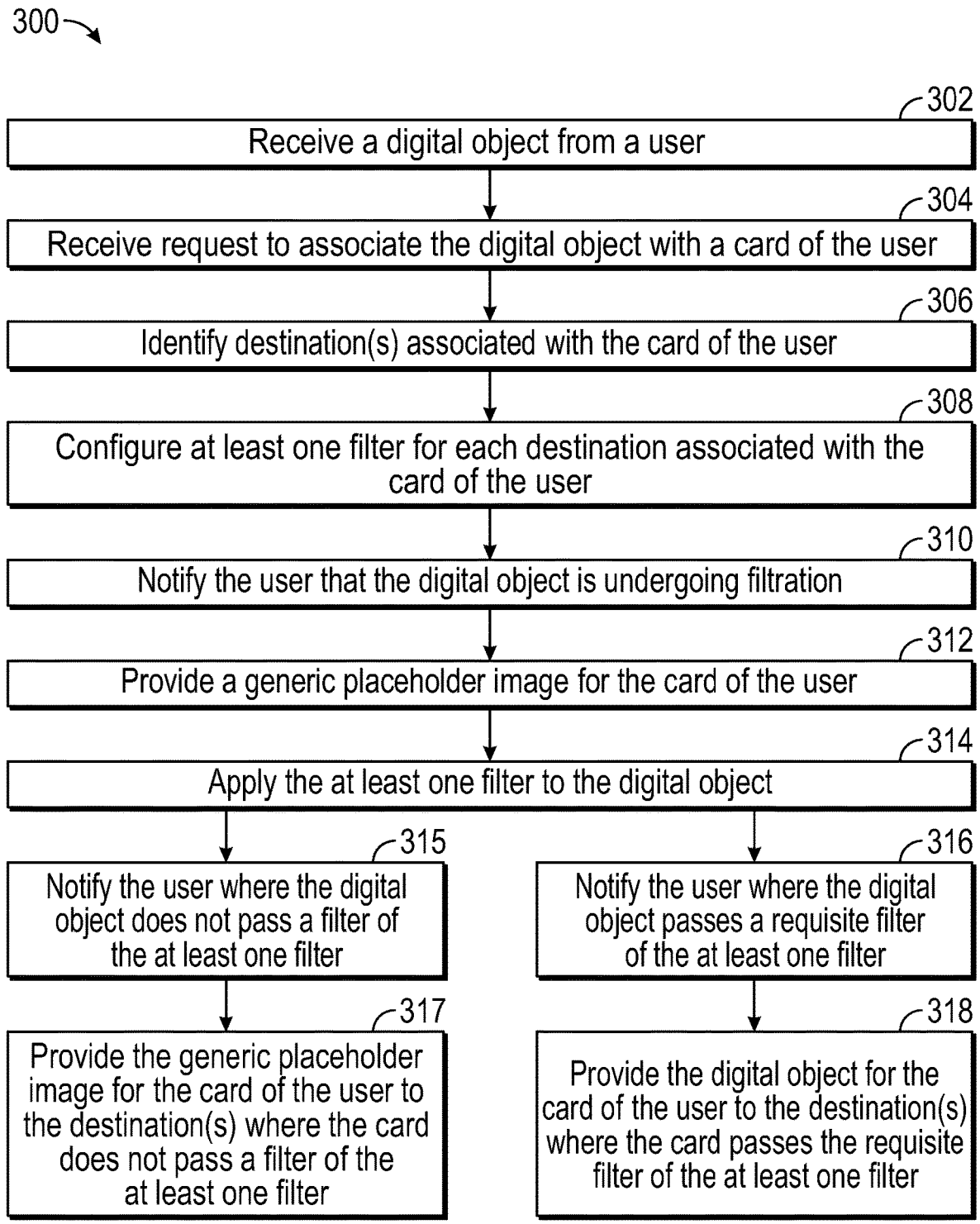
FIG. 3 is a flow diagram illustrating a process of provisioning custom digital objects to various platforms, according to an exemplary embodiment.

Referring now to FIG. 3, in combination with FIGS. 1-2, an example method 300 of associating a digital object with and/or provisioning a digital object to one or more transaction cards of a user as well as one or more third party digital platforms is shown, according to an example embodiment. In this regard, because method 300 may be implemented with the system 100 shown in FIGS. 1-2, reference may be made to one or more components of FIGS. 1-2 in explaining method 300.

At processes 302 and 304, the provider institution computing system 106 receives a request to associate a digital object with one or more transaction cards from the user mobile device 102. For example, the request may be generated based on one or more inputs received by the provider institution client application 124 (e.g., via the accessed customer card art studio 125 therein). Thus, the "request" may be a data package or payload that includes information relating to the digital object (e.g., a file or files associated therewith), an indication of a transaction card or cards to associate with the digital object, and other information that may be used to provision the digital object with various transaction cards. Accordingly, the provider institution computing system 106 may receive the digital object at process 302 and the indication of the transaction card or cards to associate with the digital object at process 304, as explained in further detail below.

More particularly, at process 302, a digital object is received by the provider institution computing system 106 from the user mobile device 102 to form part of the request to associate the received digital object with one or more transaction cards. The selected digital object may be received by the provider institution computing system 106 via the provider institution client application 124. For example, the provider institution client application 124 may be configured to receive a selection of a digital object and transmit the selected digital object to the provider institution computing system 106.

In some arrangements, the provider institution client application 124 may access digital objects stored on the user mobile device 102 (e.g., in the memory 128, a photos application stored on the user mobile device, etc.). For example, the provider institution client application 124 may include an API configured to access the memory 128 or a photo application such that photos may be presented within the provider institution client application 124 for a selection. Beneficially, this would enable a user to not have to leave the provider institution client application 124 to choose a desired digital object. Subsequently to displaying available digital objects to the user, the provider institution client application 124 may receive an indication of a selection of a digital object to be provided to the provider institution computing system 106 (e.g., the digital object a user intends to associate with one or more transaction cards).

In other arrangements, the provider institution client application 124 may access the camera 123 of the user device via an API to allow a digital object to be captured via the camera 123. In this sense, the selected digital object captured by the camera 123 may be photo or a video. Where the selected digital object captured by the camera 123 is a video, the provider institution client application 124 may provide an option to convert the video to a GIF. Upon receiving the indication of the selected digital object or capturing the selected digital object via the camera 123, the selected digital object may be provided to the provider institution computing system 106 by the user mobile device 102 (or, stored in the memory 128 and subsequently provided to the provider institution computing system 106 by the user mobile device 102). In some embodiments, the digital object is selected from one or more digital objects already stored in the customer accounts database 162 that are subsequently retrieved and transmitted for display by the provider institution client application 124.

In other embodiments, the selected digital object is received by the provider institution computing system 106 via a website. The website may be hosted by the provider institution computing system 106, may include one or more GUIs generated by the user interface management circuit 202. The website may be navigated to via a browser on the user mobile device 102 or another device configured to communicate with the provider institution computing system 106 over the network 110, such as a laptop or home computer. The user interface management circuit of the provider institution computing system 106 may generate and provide, via the website, one or more GUIs to facilitate uploading the selected digital object. In this regard, the provider institution computing system 106, via the website, may access a memory of the device navigating the website (such as the memory 128 in the case that the website is navigated via the user mobile device 102, or a memory of the laptop or home computer) and may generate and provide one or more GUIs to allow a digital object to be selected based on the digital objects stored in the memory 128 of the user mobile device 102 or other device.

At process 304, an indication of transaction card(s) to associate with the selected digital object is received by the provider institution computing system 106. In one embodiment, the transaction cards are associated with the provider institution (e.g., the provider institution is an issuer of the cards). In turn, the provider institution client application 124 may communicate with the provider institution computing system 106 to access the customer accounts database 162 and determine which transaction cards are associated with the client account associated with the provider institution. For example, the provider institution client application 124 may provide a prompt for one or more login credentials (e.g., password, biometric data, etc.) to access the provider institution client application 124 prior to providing the selected digital object. In response to receiving the credentials via a user input, the provider institution client application 124 may transmit the credentials to the provider institution computing system 106, which may verify the credentials and begin transmitting, via the application interface circuit 200, various client account details, including the transaction cards associated with the client account. In turn, the provider institution client application 124 may provide a display regarding the transaction card(s) associated with the client account for the user to select one or more to associate with the received digital object. The indication of the selected transaction card(s) may then be transmitted, by the provider institution client application 124, via the user mobile device 102, to the provider institution computing system 106. In another embodiment, the transaction cards are not associated with the provider institution (e.g., issued by a third-party associated with the third party computing system). In other embodiments, the selected transaction cards to be associated with the received/selected digital object are received by the provider institution computing system 106 via the website.

In some embodiments, such as when the transaction card is not associated with the provider institution or in instances to associate the received digital object with other cards not depicted, the provider institution computing system 106 (website-version) or provider institution client application 124 (mobile application arrangement) may generate and provide a prompt to inquiring whether the user would like to associate the digital object with other cards. Assuming the user provides an affirmative reply via the provider institution client application 124 or website, the provider institution client application 124 or website may generate a manual entry icon or automatic icon. When the user selects the manual entry icon, the user may provide details regarding the desired card into one or more fields on a GUI (e.g., account number, issuer, name, expiration date, CVV, etc.). When the user selects the automatic entry icon, the provider institution computing system 106 (website-version) or provider institution client application 124 may then provide a prompt for the user to upload a picture of one of the user's desired transaction cards. The user may then take a picture of the front and/or back of a transaction card using the camera 123. The picture may contain one or more identifications of the card (e.g., card issuer, card number, expiration date, CVC, etc.). The user may then upload the picture(s) of the card via the website or submit it via the provider institution client application 124. The provider institution computing system 106 may then receive a selection of one or more of the transaction cards to be associated with the selected digital object.

In some embodiments, no transaction cards are selected at all (i.e., no cards maintained by the provider and/or cards not associated with the provider institution). Rather, the provider institution computing system 106 may receive an indication to store the selected digital object for later use, as described below in regards to FIG. 5. The selected/received digital object may then be stored in the customer accounts database 162 by the provider institution computing system 106 with an indication that the selected digital object has yet to be associated with a transaction card and has yet to undergo the filtration steps discussed below. The stored digital object may be selected as a digital object to be associated with one or more selected transaction cards at a later time.

At process 306, one or more destinations associated with the selected cards are identified by the provider institution computing system 106 (or, provider institution client application 124). As used herein, "destinations" refer to one or more client accounts, mobile wallets, and/or third party digital platforms associated with the selected transaction card. In other words, the "destination" refers to the platform that depicts a representation associated with the selected transaction card. For example, the destination may be a merchant website that depicts a digital object (e.g., card art) associated with the transaction card. The "destination" may include the client account associated with the provider institution associated with the provider institution computing system 106 (e.g., a depiction of the transaction card from within the provider institution client application 124). For example, cards issued/maintained by the provider institution may also be depicted in the provider institution client application 124. However, as indicated above, certain desired transaction cards for the digital object may be not associated with the provider institution. In other words, the transaction card(s) selected may be associated with one or more third-party mobile wallets and/or third party digital platforms in addition to or in place of the client account maintained by the provider institution computing system 106. For example, the selected transaction card(s) may be associated with a mobile wallet associated with a third-party financial institution, where the third-party financial institution is associated with the third party computing system 108. The provider institution computing system 106 is structured to identify the destination so that the received/selected digital object may be selectively provisioned to that destination for depiction at that destination. The provider institution computing system 106 may identify and communicate with one or more third party digital platforms to determine whether the selected transaction card(s) are represented by custom digital objects on the third party digital platforms.

If the selected transaction card is issued or maintained by the provider institution, the provider institution computing system 106 may maintain a listing of platforms (e.g., third-party platforms) associated with the card (e.g., merchant A, wallet A, etc.). Based on this listing, the provider institution computing system 106 (or provider institution client application 124) may provide a notification to these third party computing system(s) 108 to determine if the associated selected transaction card is represented by a custom digital object and is capable of being associated with a custom digital object. In certain embodiments and for repeat associations with repeatedly selected transaction cards, the provider institution client application 124 or provider institution computing system 106 may store associated digital objects for those cards on those platforms so that the provider institution computing system 106 and/or provider institution client application 124 need not send a message to those platforms in order to decrease bandwidth usage and expedite the process.

As another example, the provider institution computing system 106 or the provider institution client application 124 may receive an affirmative input, via one or more GUIs, that indicates destinations associated with the selected transaction card. In this instance and even for cards issued by the provider institution, the provider institution computing system 106 may not have a record of all or nearly all of the associated third-party platforms for the selected cards. This prompt ensures that desired platforms are identified.

As yet another example and when the selected transaction card is not issued/maintained by the provider institution, the provider institution computing system 106 and/or provider institution client application 124 may utilize a variety of methods to identify destinations associated with these cards. For example, the provider institution computing system 106 and/or provider institution client application 124 may prompt the user to identify the associated destinations (e.g., card of provider institution B is maintained/associated with Merchant B, Wallet B, etc.). As another example and without substantial user input, the provider institution computing system 106 and/or provider institution client application 124 may utilize the information extracted from the automatic entry option associated with receiving the selected transaction card above. For example, the user may upload a picture of one or more transaction cards (via the camera 123) to the provider institution computing system 106 via the provider institution client application 124. The provider institution computing system 106 may in turn determine a card issuer from the picture of the transaction card and communicate with a computer system associated with the card issuer to identify destinations associated with the card. The computer system associated with the card issuer may, in response, provide an indication of one or more third party digital platforms (i.e., destinations) associated with the transaction card, as well as an indication as to whether the transaction card is represented by customizable digital objects on the third party platforms.

In still other embodiments and substantially without user input, the provider institution computing system 106 may utilize a web-crawler to search web data for digital representations of the selected transaction card, based on identifying information in the picture of the one or more transaction cards, such as a card issuer, card number, and so on. In still further embodiments, the provider institution client application 124 may, via an API gateway established by the application interface circuit 200, provide an API message to the third party digital/mobile wallets 129 of the user mobile device 102. The API message may include a request to communicably link the provider institution client application 124 to the digital platforms maintained on the third party digital/mobile wallets 129 to identify one or more transaction cards (process 304). Such a linking may enable a user to select a transaction card and to enable subsequent identification of destinations associated with the card (e.g., via the manual entry method described above, via contacting the card issuer described above, etc.).

In some embodiments, the provider institution computing system 106 may maintain a listing, in the customer accounts database 162, of all third party digital platforms associated with the transaction card(s) associated with the client account and generate a GUI, via the user interface management circuit 202, to receive one or more selections of the third party digital platforms(s) associated with the selected transaction card(s). In this situation and based on previous runs of the process where the user has desired to associate digital objects with various cards, the provider institution computing system 106 may store and track previous indications (e.g., cards and platforms associated therewith). The GUI may include icons, buttons, and other selectable features associated with editing the listing of the third party digital platforms (e.g., adding third party digital platforms, deleting third party digital platforms, and/or updating third party digital platforms).

In one embodiment and to determine whether the identified destination, such as a third-party platform, can receive custom digital objects, the provider institution computing system 106 or provider institution client application 124 may generate and provide a message to each destination requesting third party data. For example, the provider institution computing system 106 may communicate with the third party computing system 108 to receive third party data (e.g., data packages or payloads) regarding third party transaction cards (e.g., transaction cards associated with the third party computing system 108) based on these third parties being identified as "destinations" as described above. The third party data may include card numbers associated with the third party transaction cards, as well as digital objects associated with the third party transaction cards, if any. For example, in some instances, the third party computing system 108 may, via the third party digital/mobile wallets 129, depict some, all, or none of the third party transaction cards with digital objects (i.e., card art associated with the transaction card). In the event that no digital objects are received corresponding to one or more third party transaction cards, the provider institution computing system 106 may determine that the third party digital platform does not enable the representation of the third party transaction card with digital objects and cease proceeding with provisioning the selected digital object to the third party platform associated with the selected transaction card. In this example, the provider institution computing system 106 may request digital object information associated with the third-party transaction card. If the provider institution computing system 106 does not receive digital object information, the provider institution computing system 106 may interpret this response as the third party computing system 108, for this particular card, is incapable of receiving digital object information. Beneficially, this reduces sending digital object information to this third party computing system 108 by the provider institution computing system 106 to reduce bandwidth usage.

In some embodiments, where the provider institution computing system 106 determines that one or more selected transaction card(s) are represented on third party digital platforms, the provider institution computing system 106 extracts any digital objects associated with the third party transaction cards from the third party data (e.g., third party digital objects).

The provider institution computing system 106 may then compare the third party digital objects to the selected/received digital object. The provider institution computing system 106 may compare a digital object of a third party transaction card with the selected digital object by extracting image data points from the third party digital object to determine a first array of nodes, extracting image data points from the selected digital object to determine a second array of nodes defining image content data, and determine if the nodes line up beyond a predefined threshold amount (e.g., 75 percent, etc. to indicate a "match" of nodes to indicate that the objects are the same). If the nodes align beyond a predefined amount, the provider institution computing system 106 may determine that the third party digital object is the same as the selected digital object and thus the provider institution computing system 106 may determine that provisioning the digital object to the third party mobile wallet/digital platform is unnecessary and therefore not proceed with provisioning the selected digital object to the third party platform. Accordingly, the provider institution computing system 106 may provide a prompt, via the provider institution client application 124, indicating which of the third party transaction card(s) are already digitally represented by the selected digital object, and which of the third party transaction card(s) are not digitally represented by the selected digital object. The prompt may further include a selection to indicate which, if any, of the third party transaction card(s) should be associated with the selected digital object, as described in further detail below.

In some embodiments and as mentioned above, the "destinations" may further include physical instances of one or more transaction cards. For example, some or all of the selected transaction card(s) may also have physical manifestations (e.g., as a plastic card, etc.). A physical instance of the selected transaction card may be treated as a "destination" as described herein. Accordingly, the provider institution computing system 106 may access the customer accounts database 162 to extract information regarding whether the selected transaction card(s) are associated with physical cards.

Process 306 further includes determining which of the destinations are eligible for customized card art (i.e., the user selected digital object). For example, some physical cards associated with the selected transaction card(s) may not be eligible for customized card art as determined by the provider institution computing system 106 (or, based on a communication from an issuer of the selected card when the card is not issued by/associated with the provider). Such indications of eligibility may be located in, and accessed by the provider institution computing system 106, in the customer accounts database 162. For example and for cards issued by the provider institution, each of those transaction cards may include predefined levels that are stored in the customer accounts database 162. The predefined levels (e.g., standard, preferred, customizable, etc.) may indicate whether customization is allowable. For cards not associated with the provider institution, the provider institution computing system 106 may receive one or more indications from the third party computing system 108 regarding which of the third party digital platforms, and which of the third party transaction cards associated with the third party digital platforms, are eligible for customized card art. For example, the provider institution computing system 106 may transmit a request to the third party computing system 108 to receive an indication as to which third party platforms and/or which of the third party transaction cards associated with the third party platforms, are eligible for customized card art. Similar to the transaction cards discussed above, each third party transaction card may include predefined levels stored within the mobile wallet database 182.

In such cases where either the physical card and/or the digital destination is not eligible for customized card art, process 306 may be unnecessary with respect to that particular selected transaction card and/or that particular digital destination. As a result, the provider institution computing system 106 may provide the user mobile device 102 with a notification (e.g., an email, text message, push notification, etc.) that one or more selected destinations associated with the selected transaction card(s) may not be associated with and/or provisioned with the digital object. The notification may identify the reason for an inability to associate and/or provision the digital object (e.g., eligibility issues, etc.). This step may only affect some of the selected destinations. If none of the selected destinations identified through the process 306 allow for the association of the selected digital object with the selected transaction card(s), the method 300 may end. If one or more destinations identified at the process 306 are eligible/able to receive the provisioning of custom card art, the method 300 may continue to the remaining steps involved in process 308.

At process 308, the acceptable destinations remaining after process 306 are identified by the provider institution computing system 106 along with applicable filter(s). In other words, the selection of a single transaction card may trigger an association with any number of viable destinations for the digital object (e.g., third party digital platforms, physical cards, etc.) that each have their own filters. The provider institution computing system 106 may transmit a listing of the acceptable destinations to the user mobile device 102, which in turn generates a GUI, via the provider institution client application 124, indicating the acceptable destinations. The user may provide a selection of the acceptable destinations, via the provider institution client application 124, for associating and/or provisioning the selected digital object thereto. In some embodiments, the user mobile device 102 may then transmit a listing of the selected destinations to the provider institution computing system 106, which in turn provides the card art filtration circuit with identifications of the selected destinations and, subsequently, the card art filtration circuit 204 retrieves one or more filters based on the indications of the destinations. In other embodiments, the user mobile device 102 retrieves the one or more filters locally (e.g., from the provider institution client application 124) based on the indications of the destinations. Beneficially, by identifying all the various acceptable destinations on a centralized computing device (e.g., the provider institution computing system 106) and further performing the various filtration processes for each acceptable destination (as described in greater detail below) on a centralized computing device, the amount of digital object information required to be sent and received between the provider institution computing system 106 and the third party computing system 108 is reduced, which in turn reduces bandwidth usage. Moreover, as described herein, digital representations of transaction cards may be uniformly applied across various digital mediums without a need for duplicative user inputs and operations associated with provisioning the selected digital object to third party platforms in addition to associating the digital object with the client account of the provider institution client application 124.

Based on the destinations identified, one or more filters are configured at process 308. The configuring of the filter(s) refers to identifying and retrieving the appropriate filters for the digital object based on the available selected destinations. Thus, the filter(s) may be generated for use in that a precise arrangement of the filter(s) employed in each situation may differ, such that the filter (and any sub-filters thereof) may be created, arranged, or otherwise generated for the particular arrangement (digital objects and identified destinations). In some arrangements, the one or more filters may be unique to the provider institution associated with the provider institution computing system 106, and may thus be stored in the customer accounts database 162. In other arrangements, one or more filters may be unique to third party digital platforms associated with the third party computing system 108 and may thus be stored in the mobile wallet database 182 (or, in some instances, stored by the provider institution computing system 106). In still other embodiments, one or more of the filters may be stored by the provider institution client application 124 for local storage and execution to enable offline execution of certain of the filters. The "filter" refers to a process (e.g., algorithm, etc.) employed by the provider institution computing system 106 (particularly the card art filtration circuit 204; in some embodiments, the provider institution client application 124) to determine whether the received digital object may be depicted in one or more third party digital platforms, a client account maintained by the provider institution, and/or a physical card associated with the transaction card (i.e., the "destinations" described above). The filter(s) may be unique to each of the different destinations (e.g., physical versus digital platforms, various third party platforms versus the client account versus the physical card, etc.) or the filter(s) may be the same, depending on the implementation. The filters may be structured to include and in turn filter out prohibited image content. The filters may utilize various image processing techniques to determine whether the selected digital object satisfies the filter.

In some embodiments, the filter(s) each include (or include instructions for the provider institution computing system 106 to extract, from the customer accounts database 162) one or more prohibited image content files. For example, a prohibited image content file may be a copyrighted image, an explicit image, and so on (i.e., a library of images associated with predefined prohibited content). The filters may further include instructions for the provider institution computing system 106 to perform image analysis techniques to compare the one or more prohibited image content files to the selected digital object in order to determine if the selected digital object satisfies the filter.

The filters may include a copyright filter (e.g., a first filter), an explicit content filter (e.g., a second filter), a sensitive information filter (e.g., a filter for sensitive account information, a third filter, etc.), and so on. It should be appreciated that additional filters may be tailored to approach content filtering through any number of metrics (e.g., shapes, trademark, image quality, prohibited words, etc.). In some embodiments, the copyright filter may include one or more prohibited image content files relating to copyrighted images. For example, the one or more prohibited image content files relating to copyrighted images may display various artistic works, photographic works, and so on. Such prohibited image content files relating to copyrighted images may be retrieved from the customer accounts database 162 or a third-party database storing images of copyrighted artistic works. The explicit content filter may include one or more prohibited image content files relating to explicit images. For example, the explicit content filter may include one or more prohibited image content files relating to predefined explicit content (e.g., violence, drug use, and so on). Such prohibited image content files relating to explicit images may be retrieved form the customer accounts database 162 or a third-party database storing images of explicit images. In some embodiments, the sensitive account information filter may include image content files of sensitive account information relating to the client account retrieved from the customer accounts database 162, such as an account number, passwords, and so on.

In one embodiment, the provider institution computing system 106 may identify various filters that are each retrieved and utilized by the card art filtration circuit 204 in a predefined manner or order. As suggested above, each destination may have one or more filters associated with the destination, and the various filters may be unique (e.g., include different image content files, different image analysis techniques, and so on). Accordingly, for each destination, a separate set of filters may be used (hence, generation of the filter). In one embodiment, the card art filtration circuit 204 applies the first filter (e.g., the first filter for a first destination) to the selected digital object, and if the selected digital object passes the filter, as described in greater detail below, the card art filtration circuit applies a second filter, and so on. The card art filtration circuit 204 may repeat this process for one or more destinations.

In process 310, the card art filtration circuit 204 provides the user mobile device 102 with a notification (e.g., text message, email, push notification, a GUI generated by the application interface circuit 200, etc.) that the selected digital object for various identified destinations is undergoing filtration. In other embodiments, where one or more of the filters may be stored and executed locally by the provider institution client application 124, the notification may be generated and provided by the provider institution client application 124. For example, the filtration process may take a certain period of time associated with the process of applying the filters to the selected digital object described in greater detail below in regards to process 314. The notification may further provide an indication regarding the amount of time expected to complete the filtration process. The amount of time to perform the filtration process may be based on a number of factors, including but not limited to, the amount of destinations associated with the filtration process, the amount of filters to be applied to the selected digital object, the availability of memory and processing available on the network 110 to complete the process, and so on. The amount of time may be determined by the card art filtration circuit 204 based on the filters retrieved in process 308. As an example, the provider institution client application 124 may determine a total amount of comparisons expected to be run based on the number of filters to be applied to the selected digital object and the number of prohibited image content files associated with each of the filters. The provider institution client application 124 may store an average amount of time required to process a single comparison of a prohibited image content file (e.g., by starting an internal timer at the beginning of a comparison, stopping the internal timer at the end of the comparison, and averaging that time with the time taken to process other previous comparisons), multiplying the average time by the number of comparisons expected to be run to complete filtration, and determining a total expected time required to complete the entire filtration process. The expected time may be presented to a user via the provider institution client application 124 (e.g., as a countdown timer). In other embodiments, the filtration process is instantaneous or near-instantaneous. In such cases, process 310 may not need to occur and the method 300 can proceed directly to processes 312 or 314 described below. In some cases, however, where the process is near-instantaneous, the user may be presented with an interface that indicates a brief waiting period (e.g., a loading notification) at process 310.

A generic placeholder image is applied to the transaction card(s) selected by the user for provisioning the digital object to at process 312, via the user interface management circuit 202. For example, in the event that the filtration process may take longer than a predefined amount of time, the provider institution computing system 106 advantageously provisions a generic placeholder image in association with the selected transaction cards(s). The generic placeholder image may indicate that filtration is taking place for the digital object (i.e., the custom card art). For example, the generic placeholder image may be an image with words articulating that card art customization is underway. In some other embodiments, the generic placeholder image is simply the image that was most recently associated with the transaction card(s) before the method 300 began with process 302. In other embodiments, a blurred version of the digital object is temporarily provisioned to the selected transaction cards(s) at process 312. In other embodiments still, the generic placeholder image is a standard image used by the provider institution associated with the provider institution computing system 106.

At process 314, provider institution computing system 106 (particularly, the card art filtration circuit 204) applies the filter(s) to the selected digital object. For each filter, the provider institution computing system 106 (or, in some implementations, the provider institution client application 124) may determine whether the selected digital object satisfies (i.e., passes) each filter. The provider institution computing system 106 (particularly, card art filtration circuit 204) may compare the selected digital object with each of the prohibited image content files of each filter by extracting image data points from the selected digital object to determine a first array of nodes, extracting image data points from one of the one or more prohibited image content files to determine a second array of nodes defining image content data. In some embodiments, and as suggested above, the selected digital object may be a GIF. In such cases, the provider institution computing system 106 compares each of the individual frames of the GIF (e.g., the individual images of the GIF that, when presented and replaced in series, display a moving video) with each of the prohibited image content files. If the nodes match-up/align beyond a predefined threshold amount (e.g., 75 percent, etc. to indicate a "match" of nodes to indicate that the objects are the same), the provider institution computing system 106 may determine that the selected digital object includes at least part of the prohibited image content file. Thus, the provider institution computing system 106 may determine that the selected digital object does not satisfy the filter. If the nodes do not align beyond the predetermined amount, the provider institution computing system 106 determines that the digital object passes that filter and then applies the next filter until each of the prohibited image content files of the retrieved filters have been compared to the selected digital object. In some embodiments, each filter may include a different pre-determined threshold amount in order to indicate a "match." For example, for a first filter associated with copyrighted content, the pre-determined threshold may be lower (e.g., 50%) than a second filter associated with explicit content (e.g., 80%). The various pre-determined thresholds may be determined by a provider institution (or third party) based on a purpose of the filter. For example, in order to avoid copyright mis-use, the first filter may have a low pre-determined threshold to avoid significant similarities between the selected digital object and a copyrighted work. However, regarding explicit content filtered by the second filter, the pre-determined threshold may be set higher to avoid unnecessary filtration of selected digital objects that merely resemble various explicit content without actually depicting the explicit content sought to be prevented from representing the selected transaction card(s).

In some embodiments, if the selected digital object satisfies all of the filters applied to the selected digital object, the provider institution computing system 106 may determine that the selected digital object is acceptable for display as a digital representation of the selected transaction card(s). In other embodiments, if the selected digital object satisfies all the filters applied to the digital object with respect to a particular destination, but fails to satisfy all the filters applied to the digital object with respect to another particular destination, the provider institution computing system 106 determines that the selected digital object is acceptable for display as a digital representation of the selected transaction card(s) as provisioned to the destination with the satisfied filters, but is not acceptable for provisioning to the destination with one or more filters that were not satisfied. As described in greater detail below, the provider institution computing system 106 and/or provider institution client application 124 may provide one or more notifications listing the results of the filtration process.

In various implementations, a size of either the prohibited image content file may differ from the size of the digital object or vice versa. In other words, the prohibited image content file may include a greater number of image data points than the selected digital object, or vice-versa. In this case, the card art filtration circuit 204 may perform a sampling step prior to comparing the selected digital object to a prohibited image content file, where the card art filtration circuit determines the number of image data points in the larger of the prohibited image content file and the selected digital object, determines the number of image data points in the smaller of the prohibited image content file and the selected digital object, and determines a number of groups of image data points among the larger of the prohibited image content file and the selected digital object. As such, the number of groups is the same, or substantially the same, as the number of image data points in the smaller of the prohibited image content file and the selected digital object. For each of the groups of image data points, the card art filtration circuit may determine a representative image data value (e.g., an average) of each of the image data points included in each group and use the representative image data value to provide a new image file with the same number of image data points as the smaller of the prohibited image content file and the selected digital object, the new image file now defining an array of nodes with the same, or substantially the same dimensions as the other array of nodes for comparison. For example, a particular image data point may be interpreted by a display device (e.g., input/output circuit 121 of the user mobile device 102) to depict a color based on a series of three values making up the image data point. The series of three values may be based on Red-Green-Blue coding (e.g., (255,0,0) equates to Red, (0,255,0) equates to Green, (0,0,255) equates to Blue, (255,255,255) equates to black, and various combinations depicting other colors). A number of image data points may then be averaged by adding the "Red" values, "Green" values, and "Blue" values of the image data points in the group and dividing each sum by the number of image data points in the group. (e.g., an average of (255,0,0) signifying Red and (0,0,255) signifying Blue would produce (127.5, 0, 127.5), which equates to Purple) which, when reproduced among the other groups of image data points, may produce a similarly depicted digital object in terms of color scheme.

The method 300 may then follow an option 315 or an option 316. Regarding option 315, a notification may be provided by the provider institution computing system 106 that the selected digital object does not satisfy one or more filters and therefore the selected digital object is denied from associating and/or provisioning to the selected transaction card at one or more destinations. The notification may be provided to the user mobile device 102 or the website hosted by the provider institution computing system 106, depending on the implementation.

Regarding option 316, a notification that the selected digital object satisfied one or more filters may be provided by the provider institution computing system 106. The notification indicates that the digital object may be displayed in association with the selected transaction cards at an association of one or more destinations associated with the transaction card(s).

As an example of operation, the provider institution computing system 106 may receive a selected digital object from the user mobile device 102, and the selected digital object may be desired to be associated with not only the client account on provider institution client application 124 (destination #1) but also a physical card (destination #2). The client account may have a different filter than the physical card, such that the filter applied for the client account may be less sensitive to inappropriate content than the filter applied for the physical card (e.g., more prohibited images are associated with the filter for the physical card, a lower match amount between the digital object and each prohibited image is utilized for the physical card, etc.). In this case, the selected digital object may be acceptable (e.g., pass filters) for display digitally in the client account (e.g., within the provider institution client application 124) but not on the physical card. Here, the user mobile device 102 or the website may be presented with a notification that identifies that the selected digital object did not satisfy the filter (e.g., was filtered out) for the provider institution client application 124 but did satisfy the filter for the physical card. Accordingly, the digital object may be associated with the transaction card on the provider institution client application 124 but may not be applied to a physical card to be provided to the user.

The generic placeholder image of the card may be displayed in association with the transaction cards(s) for destinations where the received/selected digital object does not meet one or more filters at process 317. As suggested above, process 317 occurs in the event that option 315 occurs. For example, as suggested above, one or more filters associated with various destinations may prevent the digital object from being provisioned to a particular instance of the digital display of a transaction cards (i.e., that destination). In this case, a generic image of the card may be provisioned for such instances. In some embodiments, the generic image is the image that the transaction cards previously displayed prior to the beginning of method 300 (e.g., before the user made a selection to provision a new digital object for the transaction cards). In other embodiments, the generic image is a different generic placeholder image provided by the financial institution.

The digital object is associated with and/or provisioned to the destinations where the digital object meets the one or more filters associated with the one or more destinations at a process 318. Process 318 occurs in the event that option 316 occurs.

Regarding the client account associated with the provider institution, associating the digital object with the selected transaction card(s) on the client account may involve replacing the previous custom digital object or generic image displayed on the card with the uploaded digital object provided by the user. For example, the selected digital object may be then be displayed via the provider institution client application 124 to represent the selected transaction card(s). In some embodiments, the provider institution client application 124 may display the selected digital object upon closing and re-opening the provider institution client application 124 (i.e., a refresh). In some embodiments, the provider institution client application 124 automatically refreshes the GUIs associated with displaying the transaction card(s), such that the selected digital object may be seen to represent the selected transaction card(s) without the need to close and re-open the provider institution client application 124.

Regarding the third party digital platforms, the selected digital object may then be provisioned to the third party computing system 108 for display in those third party platforms (via the third party mobile/digital wallets 129, for example). In some arrangements, provisioning the digital object to third transaction cards(s) on the third party digital platform(s) may involve providing the selected digital object to the third party computing system 108 along with the transaction cards number(s) to be provisioned with the digital object. In turn, the third party computing system 108 may replace digital object(s) representing the selected transaction card(s) on the one or more third party platforms with the selected digital objects(s). For example, a user may open a third party platform application, such as the third party digital/mobile wallets 129 and see the selected digital object(s) representing the selected transaction cards. In turn, the user may also open the provider institution client application 124 and see the same selected digital object representing the selected transaction card(s) on the provider institution client application 124.

Regarding physical cards, provisioning the digital object to a physical card may include creating (e.g., manufacturing, printing, providing, etc.) a new physical card (e.g., a replacement card) with the digital object displayed on the physical card, which may be a replacement card. The process of creating the replacement card may be initiated by the provider institution computing system 106. It should be appreciated that for a single request by the user that invokes multiple destinations and/or multiple transaction cards, each of process 317 and process 318 may occur in any number of particular instances in response to a single request.

In some embodiments, the selected digital object to be associated with the selected transaction card(s) may be adjusted by the provider institution computing system 106 to fit (e.g., have the correct dimensions for) the digital representation of the transaction card. In various implementations, digital representations of transaction cards may be substantially modeled to appear similar to physical cards (e.g., a substantially horizontal rectangular shape, four rounded edges, and so on). However, the selected digital object may be of various dimensions (e.g., substantially square shape, substantially vertical rectangular shape, etc.) that differ from the digital representation of the transaction card. Accordingly, the provider institution computing system 106 may, prior to associating the selected digital object with the selected transaction card(s), re-size the selected digital object. For example, the card art filtration circuit 204 may be configured to re-size the selected digital object to fit within the predefined allowable digital representation area. The card art filtration circuit 204 may receive (e.g., from the provider institution client application 124) dimensions for the digital representation of the transaction card. The dimensions for the digital representation of the transaction card may be proportional rather than absolute, given the variations in display sizes associated with presenting the digital representations of the transaction card(s). For example, while an absolute dimension may indicate four inches long and two inches tall, a proportional dimension may indicate that two edges of the image are half as long as the other two edges of the image. In response, the card art filtration circuit 204 may re-size the selected digital object to fit the desired space. The card art filtration circuit 204 may extract image data points from the selected digital object to form an array of nodes, determine the proportions of the array of nodes (e.g., edges on a one-to-three) ratio. Based on the proportions of the array of nodes, the card art filtration circuit may then perform a sampling operation to adjust the proportional dimensions to fit the allotted space. For example, if the dimensions of the array of nodes of the were one-to-three (height-to-horizontal) and the proportional dimension indication provided by the provider institution client application were one-to-two, the card art filtration circuit 204 may determine that vertical segments of the array of nodes should be averaged (e.g., the image data values indicating colors should be averaged) and the vertical segments would be re-generated with the same proportional height, yet with an increased proportional width, and reassembled to provide an adjusted digital object that matches the proportions of the intended digital representation of the selected transaction cards. In various arrangements, the card art filtration circuit 204 may re-format the selected digital object in other ways, such as brightening or sharpening the selected digital object.

In other embodiments, the selected digital object to be associated with the selected transaction card(s) and/or provisioned to the third party transaction card(s) may cropped and/or "zoomed" via a user input as prompted by the provider institution client application 124 to fit (e.g., have the correct dimensions for) the digital representation of the transaction card. For example, the provider institution client application 124 may provide a notification that the selected digital object is too large, and generate a GUI that overlays a frame defining the correct dimensions for the digital representation of the transaction card. The user may, in turn, provide manual inputs (e.g., via the touchscreen of the user mobile device 102) to zoom in on the image (e.g., where the selected digital object was too small), zoom out on the image (e.g., where the selected digital object was too large), and/or drag the image to a particular location with respect to the frame (e.g., where the selected digital object was too large), such that the portion of the selected digital object would be cropped from the portions of the selected digital object outside the frame. The user may select a confirmation icon on the GUI to confirm the various changes and the provider institution client application would update the selected digital object accordingly for display.

In other embodiments and even if the digital object does not fit within the allotted space, the provider institution client application 124 and/or the third party digital/mobile wallets 129 may be configured to display the digital object. For example, the digital object may not be rectangular, but rather be circularly shaped, or be dimensioned as an outline of a particular thing. For example, the when viewing a transaction card, a user may see an animal, a sports team logo, a dollar bill sign, and so on. Thus, in some embodiments, the provider institution computing system 106 may provide the selected digital object as-is, and the provider institution client application 124 may be configured to associate the selected digital object to represent the card.

As indicated above, in some instances, the selected digital object may be an animated image (e.g., a video, such as a GIF). The provider institution computing system 106 may provide the selected digital object as a GIF, and the provider institution client application 124 may display the GIF by cycling through a series of digital object frames included in the GIF. For example, when viewing the transaction card, as displayed on the provider institution client application 124, a user may see an eagle moving in flight to represent the card, a running dog, and so on. Third party platforms may similarly display the GIF on various websites, mobile wallets, etc. in order to represent the selected transaction card(s). As another example, a digital object as a GIF may represent the various digital representations of the selected transaction card(s) by providing a scrolling message regarding the selected card (e.g., a message that passes from right to left across the area associated with the transaction card, which may read as messages such as "ONLY USE FOR EMERGENCIES").

In some embodiments, the selected digital object may be paired with or otherwise associated with identifying features of the selected transaction card(s). For example, the provider institution computing system 106 may, prior to providing the digital object to the user mobile device 102 for display via the provider institution client application 124, extract various identifying features in an image format regarding the selected transaction card(s) (e.g., a name on the card, a logo of a financial institution, etc.) from the customer accounts database and super-impose the identifying feature on the digital object. The adjusted digital object may then be provided to the user mobile device 102 for display via the provider institution client application 124. In other embodiments, the provider institution client application 124 may similarly adjust the selected digital object (e.g., in embodiments where the identifying features may be extracted from the memory 128 of the user mobile device 102), provide the adjusted digital object to the provider institution client application 124 along with the extracted identifying features, and the provider institution client application 124 may provide the adjusted digital object to various third party digital platforms (e.g., to the third party computing system 108).

It should be appreciated that the various steps described herein may be taken in various orders, and certain steps may not be completed as described herein, depending on the implementation. Further, it should be appreciated that, while the various steps and methods described herein have been described as conducted or facilitated by the provider institution computing system 106, such steps and methods may be included as programming logic within the provider institution client application 124 of the user mobile device 102, such that the various steps and methods described herein are performed via the user mobile device 102.

In a sample embodiment according to the systems and methods described herein, a user may open the provider institution client application 124 and provide credentials to log in to the client application. Upon logging into the provider institution client application 124, the provider institution client application 124 may display various transaction cards associated with a client account and be presented with one or more account management options. An account management option may be an option to update custom card art associated with the one or more depicted transaction cards. The option may be selected via user input and, in turn, provider institution client application 124 may provide a prompt to upload a digital object, which may be provided by the user by selecting a digital object stored on the user mobile device 102. In response to receiving the selected digital object, the provider institution client application 124 may present the user with a GUI with a prompt to select one or more transaction cards associated with the client account associated with the provider institution client application 124. In response to a user input defining selected transaction card(s), the user mobile device 102 may provide the selected transaction cards to the provider institution computing system 106. In turn, the provider institution computing system 106 may determine one or more destinations associated with the selected transaction cards, which may include, in addition to the client account depicted on the provider institution client application 124, third party platforms such as mobile wallets, websites, and so on (e.g., based on identifying an issuer from the card and sending a message to the issuer, from an express user input, etc.). The provider institution computing system 106 may then retrieve various filters associated with each of the destinations configured to filter out prohibited content. The provider institution computing system 106 then applies each of the filters for each destination to the selected digital object to determine whether the digital object satisfies the filter(s) for any of the destinations. Applying each of the filters to the selected digital object may include comparing, via various image analysis techniques described above, the digital object to one or more prohibited content files associated with the individual filter to determine whether the selected digital object reaches a threshold similarity to any of the prohibited content image files. For each destination that the selected digital object satisfies, the digital object may in turn be displayed on the destination to represent the selected transaction card(s). For example, the provider institution client application 124 may now display the selected digital object to represent the selected transaction card(s), which may also be displayed in various third party digital platforms.

Figure 4:
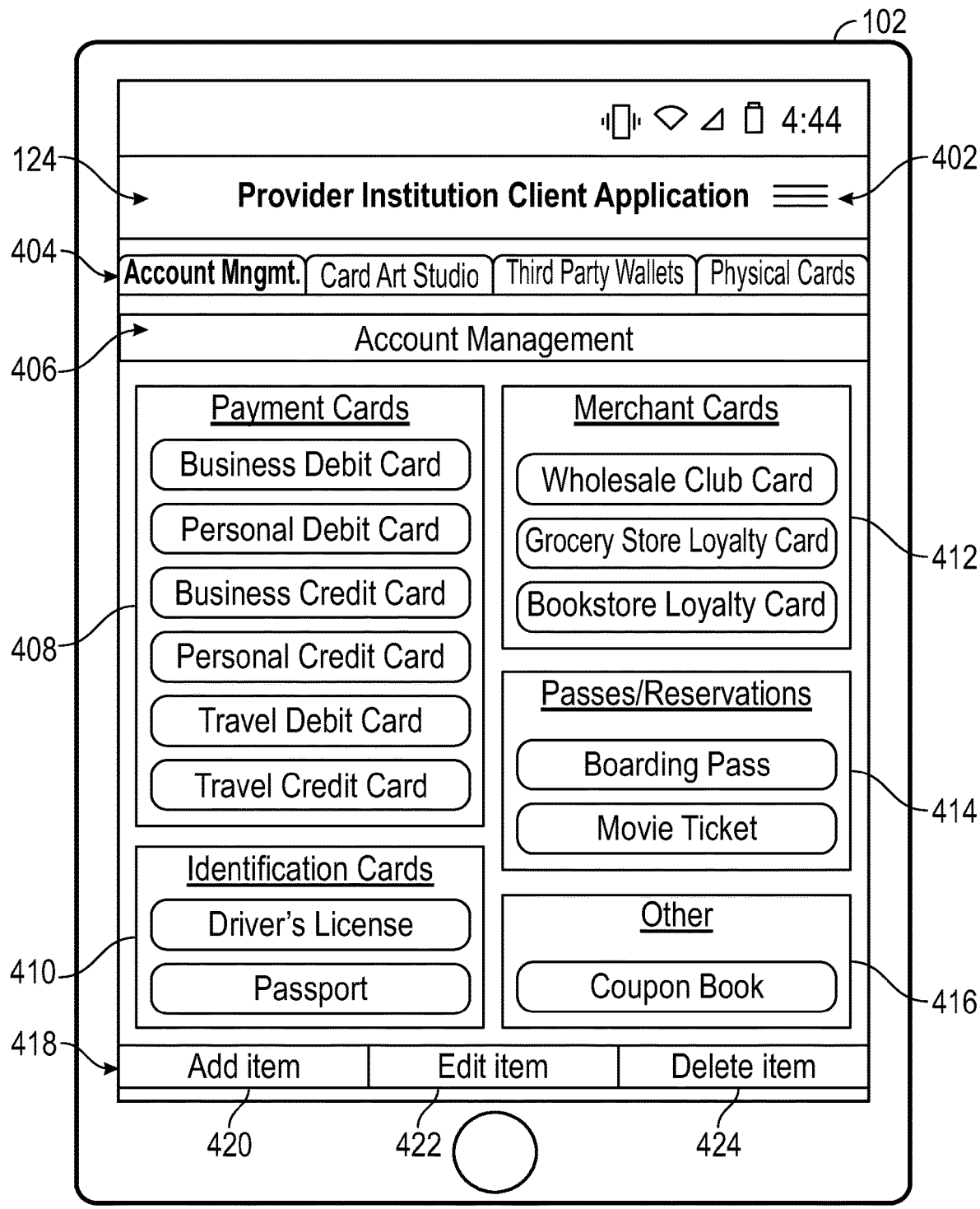
FIGS. 4-7 are graphical user interfaces provided via the provider institution client application of FIG. 1, according to various exemplary embodiments.

Referring to FIG. 4, an example screenshot of an account management page 406 is illustrated, according to an example embodiment. The account management page 406 may be accessible via the provider institution client application 124. The account management page 406 includes sections showing categories of items that the user has registered to the client account. For example, registration occurs when a user uploads data, via the provider institution client application 124 associated with a transaction card issued by the provider institution (e.g., a card number, a card number in combination with user-specific login credentials, etc.) to the provider institution client application 124, which in turn stores the transaction card information (e.g., in the customer accounts database 162) for managing the provider institution client application 124 to display the transaction card in association with the account. In the example of FIG. 4, the account management page 406 includes a payment cards section 408, an identification cards section 410, a merchant cards section 412, a passes/reservations section 414, and an "other" section 416. In other implementations, however, only some of the sections may be accessible via the provider institution client application 124, such as the payment cards section 408. The payment cards section 408 includes various payment vehicles that the user has registered to the client account, such as debit cards, credit cards, and gift cards. Accordingly, as shown in FIG. 4, the payment cards section 408 includes a debit card, a personal credit card, a travel credit card, a business credit card, and a gift card. The identification cards section 410 includes various cards or other forms of identification the user may possess, such as a driver's license, an employee identification card, a passport, a passport card, and so on. The identification cards section 410 shown in FIG. 4 thus includes a driver's license and a passport. The merchant cards section 412 includes membership cards, loyalty cards, rewards cards, and so on that the user may hold with various merchants. In FIG. 4, the merchant cards section 412 includes a wholesale club card, a grocery store loyalty card, and a bookstore loyalty card. The passes/reservations section 414 includes various passes, tickets, and reservations the user may hold, such as boarding passes, train tickets, bus tickets, movie tickets, concert tickets, amusement park tickets, hotel reservations, and so on. Accordingly, the passes/reservations section 414 shown in FIG. 4 includes a boarding pass and a movie ticket. The other section 416 may include any items that do not fit into one of the other categories, such as coupons, shopping lists, and so on. In FIG. 4, the other section 416 includes a coupon book.

In some embodiments, the account management page 406 may be unable to show all of the items the user has registered to the client account. Accordingly, the account management page 406 may only show the items that the user has used the most frequently, while allowing the user to select a section 408-416, which redirects the user to a page that shows all of the items in that section. Alternatively, the account management page 406 may display only some of the items provisioned in the client account at any given time and may allow the user to scroll up or down to see all of the items in the client account.

The account management page 406 may further include a menu 418 for modifying the items associated with the client account. As shown in FIG. 4, the menu 418 includes an "add item" button 420, an "edit item" button 422, and a "delete item" button 424. By pressing the add item button 420, the user may be able to add (e.g., associate, provision, etc.) additional items to the client account. For example, by pressing the add item button 420, the user may be redirected to a page or provided with a pop-up menu that allows the user to select a type of item the user wishes to add, input information relating to the item (e.g., the PAN of a payment vehicle), take a picture of the item, specify a source of the item (e.g., an online account held by the user), and so on. By pressing the edit item button 422, the user may be able to edit items already associated with the client account, such as the items shown in the sections 408-416. For example, by pressing the edit item button 422, the user may be able to select an item shown in sections 408-416 and edit characteristics of that item, such as the category of the item, a nickname for the item, an expiration date for the user, and so on. Finally, by pressing the delete item button 424, the user may be able to delete one or more of the items shown in the sections 408-416.

Figure 5:
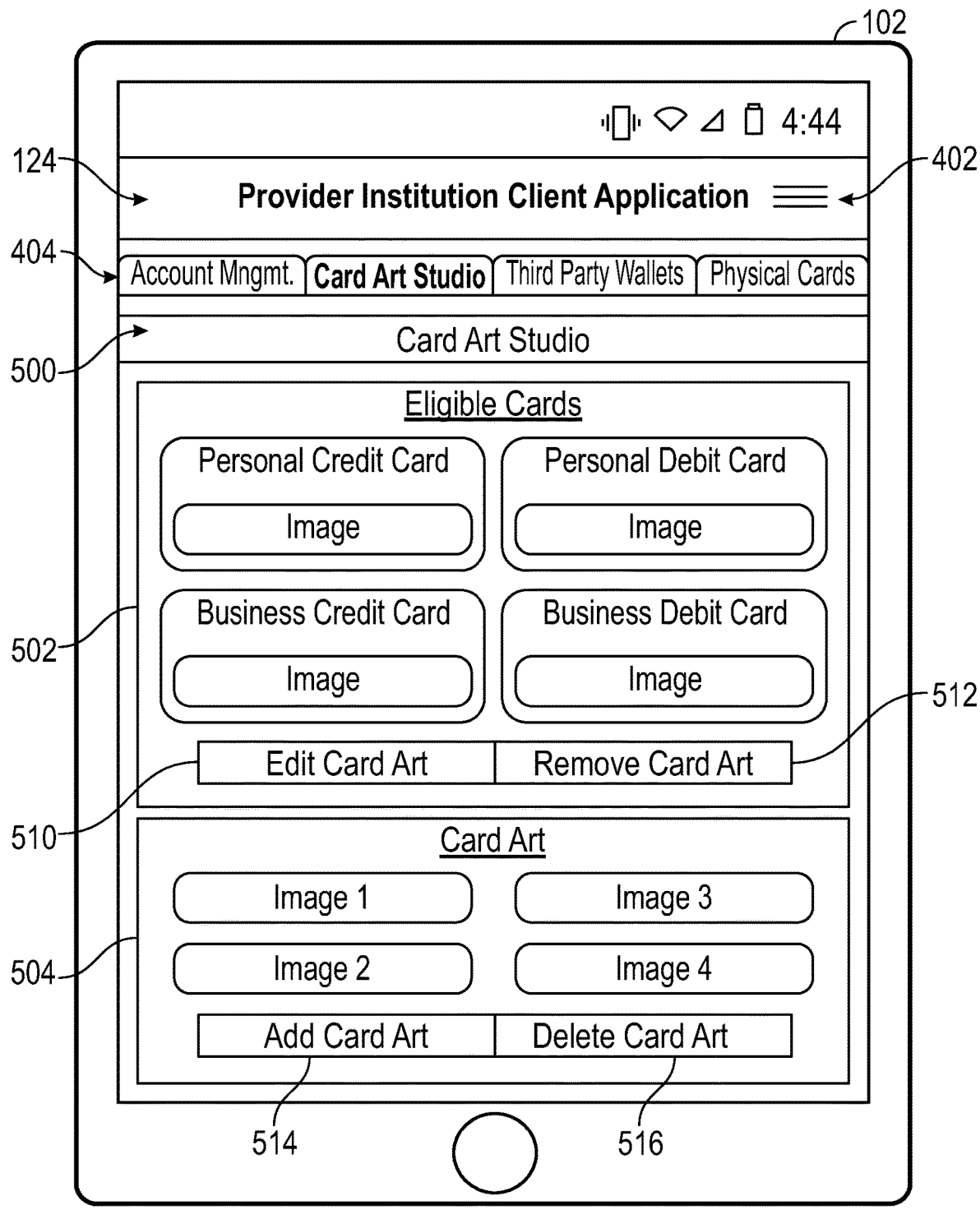

Referring now to FIG. 5, an example screenshot of a card art studio page 500 is illustrated, according to one embodiment. The card art studio page 500 may exemplify a view presented via the user mobile device 102 when operating the customer card art studio 125 of the provider institution client application 124. The card art studio page 500 displays an eligible cards section 502 and a card art section 504. In some embodiments, the eligible cards section 502 includes various transaction cards associated with the client account and are also eligible for customized card art. As shown, the "personal credit card," "business credit card," "personal debit card," and "business debit card" are displayed as eligible cards. In other embodiments, all transaction cards are presented (inasmuch as the card art studio page 500 is able to show each card's digital appearance) and the eligibility for each transaction cards' card art customization is not made known to the user unless the user initiates a request to customize card art, as described in further detail in regards to FIG. 3.

In some embodiments, the transaction cards displayed in the eligible cards section 502 may be overlaid with the current digital object displayed on the card face. For example, the transaction cards in the eligible cards section 502 may show the digital objects previously uploaded and associated with the various transaction cards as described herein. As another example, some of the cards may be displayed with a generic image provided by the provider institution in the case that a custom card art has yet to be assigned to the transaction cards. In other embodiments, the transaction cards may be displayed with a generic digital object as a result of an ongoing filtration process, as described above in regards to FIG. 3. In some embodiments, the transaction cards may be pressed by the user to flip to a backside of the transaction card and display a backside digital object displayed on the transaction cards.

In some embodiments and similar to the account management page 406, the card art studio page 500 may include one or more menus. A first menu is displayed in the eligible cards section 502 and a second menu is displayed in the card art section 504. The first menu includes an "edit card art" button 510 and a "remove card art" button 512. By pressing the edit card art button 510, the user may be able to change the digital object displayed on a particular transaction cards. For example, by pressing the edit card art button 510, the user may be given the option to select one or more of the transaction cards in the eligible cards section. This may include the display generated by the user mobile device 102 being redirected to a page or provided with a pop-up menu that allows the user to select a transaction cards. Alternatively, this may include selecting one of the transaction cards as they are displayed in the eligible cards section 502. By selecting one of the transaction cards, the user may be given the option to select a digital object to replace the current image displayed on the transaction cards. This may include the user being redirected to a page or provided with a pop-menu that allows the user to select a digital object. Alternatively, this may include selecting one of the digital objects displayed in the card art section 504. By pressing the edit card art button 510 and by proceeding as described above, the card art studio page 500 (in association with the customer card art studio 125 and the provider institution client application 124 in general) may prompt the initiation of the method 300 described above in regards to FIG. 3.

In some embodiments, by pressing the remove card art button 512, the user may be given the option to remove the custom card art (if applicable) from one or more transaction cards. For example, the digital object displayed a transaction cards may be reverted back to the generic digital object initially provided for the transaction cards by the provider institution.

In some embodiments, the card art section 504 includes a number of digital objects that the user has already provided to the client account without yet associating the digital object with a particular transaction cards, as described above in regards to FIG. 3. Thus, the card art section 504 may include a second menu. The second menu may include an "add card art" button 514 and a "delete card art" button 516. By pressing the add card art button 514, the user may be able to upload a new digital object to the client account (and therefore store in the customer accounts database 162, customer accounts database 162, and/or the memory 128). This may include the user being redirected to a page or provided with a pop-up menu that allows the user to upload a new digital object. As described above in FIG. 3, the process of the object undergoing filtration may last for a period of time. While the digital object is undergoing filtration, a generic placeholder image may appear in the card art section 504. As suggested above regarding FIG. 3, a notification as to whether the image meets the one or more implicated filters may be provided at a redirected page, provided with a pop-up menu, or displayed directly on the card art studio page 500. By pressing the "delete card art" button 516, the user may remove one or more previously digital objects from the client account (and accordingly remove the image from the customer accounts database 162, the customer accounts database 162, and/or the memory 128). In some embodiments, the user may delete a digital object that is presently provisioned to one or more transaction cards. In some arrangements, this scenario may result in the digital object being removed from the one or more transaction cards, with a generic digital object being displayed in association with the one or more transaction cards in the previously stored image's place). In other arrangements, the image remains provisioned to the one or more transaction cards involved, but is simply unavailable for future provisioning requests.

Figure 6:
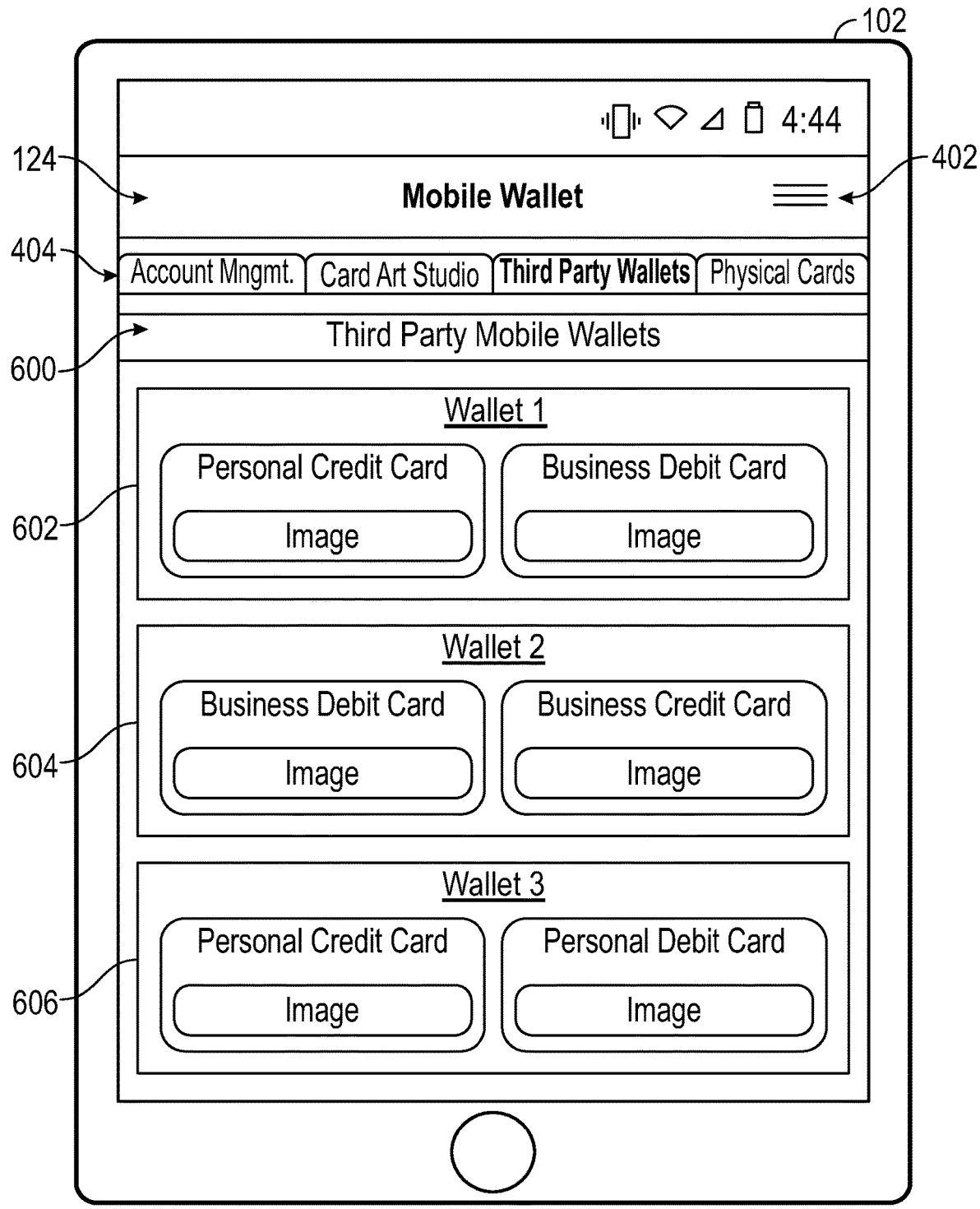

Referring now to FIG. 6, an example screenshot of a third party wallets (e.g., third party platforms) page 600 is illustrated, according to one embodiment. The third party wallets page 600 may display the transaction cards associated with one or more third party wallets maintained by the user. As shown, the third party wallets page 600 displays transaction cards in a first wallet section 602, a second wallet section 604, and a third wallet section 606. The information necessary to populate this page may be provided over the network 110 from one or more third party financial institutions, such as the third party financial institution associated with the third party computing system 108. For example, the provider institution computing system 106 may store a registry regarding each particular user of the provider institution and information regarding third party wallets maintained by the user. Such a registry may be stored in the customer accounts database 162 or the customer accounts database 162, and include various information necessary to associate the third party wallets with the user (e.g., unique user identifiers, tokens, card numbers, etc.). In some embodiments, only cards associated with the client account and further associated with a third party mobile wallet are displayed on the third party wallet page 600. In other embodiments, additional cards associated with one or more third party wallets, but not associated with the client account, are displayed in the third party wallets page 600. The third party wallets page 600 may allow a user to observe the images provisioned to one or more transaction cards (as described above and particularly in regards to FIG. 3) that were further provisioned to third party wallets. As described above, the various eligibility and filtration concerns regarding the multiple destinations of each image uploaded for provisioning to the user's client account or mobile wallets may result in a transaction card displaying the digital object for one client account or mobile wallet, and so on. For example, the user's personal credit card displayed in the first wallet section 602 may display a different digital object than the personal credit card displayed in the third wallet section 606, which may display a different image than the personal credit card displayed in the eligible cards section 502 of the card art studio page 500, and so on.

Figure 7:
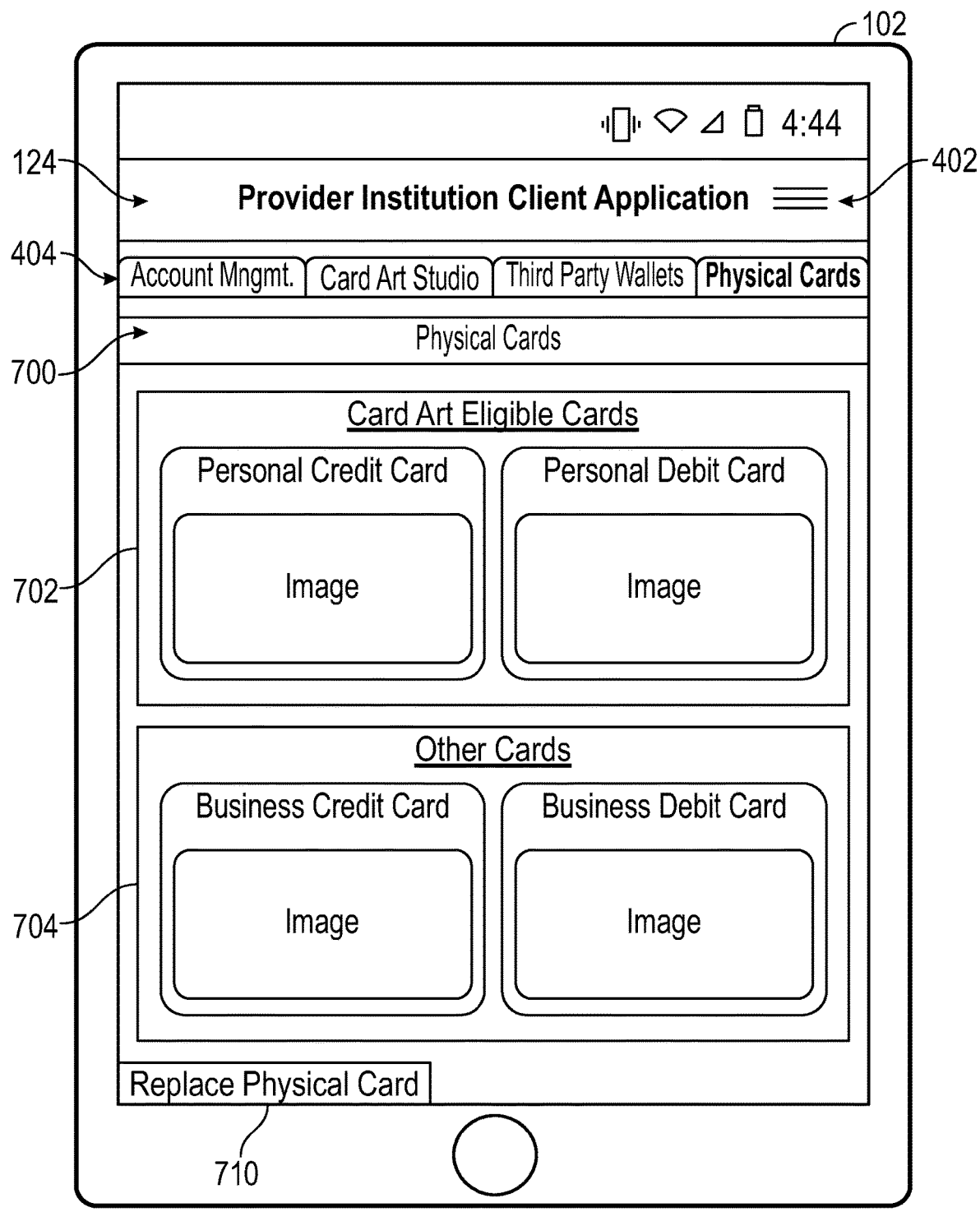

Referring now to FIG. 7, an example screenshot of a physical cards page 700 is illustrated, according to one embodiment. In general, the physical cards page 700 relates to the one or more cards that the user has provided to the client account that are further maintained in physical (e.g., plastic, hand-held, printed, etc.) form. It should be understood that not all transaction cards that a user has registered to the client account may be actively maintained in physical form by the user, although in some cases the user may in fact maintain all transaction cards in a physical form. The physical cards page 700 includes a card art eligible cards section 702 and an other cards section 704. The card art eligible cards section 702 may display the various physical cards held by the user that are eligible for card art customization. In some embodiments, the cards displayed in the card art eligible cards section 702 may show the custom card art provisioned to the relevant transaction cards registered to the client account that are further maintained as a physical card. The other cards section 704 may display the various physical cards held by the user that are not eligible for card art customization. The physical cards page 700 may include a menu. The menu includes a "replace physical card" button 710. By pressing the replace physical card button 710, the user may initiate a process by which a physical card held by the user is replaced. For example, a user may lose or damage a physical card. As such, the user may wish to replace the physical card, which may take place at a store-front location of the provider institution or occur via a mailing process. Pressing the replace physical card button 710 may prompt one or more GUIs to facilitate the user selecting the physical card (whether from the card art eligible cards section 702 or the other cards section 704) for replacement. In the event that the user selects a card from the card art eligible cards section 702, the user may be prompted to select a digital object (e.g., an image from the card art section 504 described in regards to FIG. 5). In other arrangements, the physical cards displayed in the card art eligible cards section 702 may already be associated with an image provisioned to the transaction cards, and therefore the replacement card process may assume that the desired card art to be displayed on the physical card is the present image associated with the transaction cards as shown.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computer-implemented method, comprising:
receiving, by a provider institution computing system, a request to associate a card with a digital object;
generating, by the provider institution computing system, at least one filter that defines prohibited content for card images, the at least one filter comprising a first filter;
extracting, by the provider institution computing system, image content from the digital object;
determining, by the provider institution computing system, that the image content satisfies the first filter;
in response to the determination that the image content satisfies the first filter, associating, by the provider institution computing system, the digital object with the card in a database of the provider institution computing system;
causing, by the provider institution computing system, a provisioning of the digital object associated with the card to a provider institution client application associated with the provider institution computing system to display the digital object as being associated with the card;
receiving, by the provider institution computing system, a credential associated with a third-party digital platform depicting a digital representation of the card;
providing, by the provider institution computing system, the received credential to the third-party digital platform depicting the digital representation of the card; and
receiving, by the provider institution computing system, an indication of a verification of the received credential and subsequently linking the provider institution computing system with the third-party digital platform.

2. The computer-implemented method of claim 1, wherein the prohibited content comprises at least one of explicit content and copyrighted content.

3. The computer-implemented method of claim 1, further comprising:
based on the linking, receiving, by the provider institution computing system, third-party image content associated with the card from a computing system associated with the third-party digital platform;
comparing, by the provider institution computing system, the third-party image content to the digital object;
determining, by the provider institution computing system, that the third-party image content differs from the digital object; and
providing, by the provider institution computing system, the digital object that replaces the third-party image content such that the digital object is depicted in the third-party digital platform in place of the third-party image content.

4. The computer-implemented method of claim 3, wherein the at least one filter comprises a second filter associated with the third-party digital platform, the first filter being associated with the provider institution computing system and the second filter being different from the first filter, wherein the method further comprises determining, by the provider institution computing system, that the image content satisfies the second filter.

5. The computer-implemented method of claim 1, further comprising:
determining, by the provider institution computing system, that the card is associated with a physical card provided by a provider institution associated with the provider institution computing system; and
in response to the determination that the card is associated with the physical card, associating, by the provider institution computing system, the digital object with the physical card in the database of the provider institution computing system.

6. The method of claim 5, wherein the at least one filter comprises a second filter associated with physical cards provided by the provider institution computing system, the first filter being associated with digital cards associated with the provider institution computing system, and the second filter being different than the first filter, wherein the method further comprises determining, by the provider institution, that the image content passes the second filter.

7. The method of claim 5, further comprising:
receiving, by the provider institution computing system, a request to replace the physical card with a replacement physical card;
in response to receiving the request to replace the physical card with the replacement physical card, causing, by the provider institution computing system, creation of the replacement physical card, wherein the replacement physical card displays the digital object; and
initiating, by the provider institution computing system, a process wherein the replacement physical card is provided to replace the physical card.

8. The method of claim 1, further comprising:
filtering, by the provider institution computing system, the image content by the first filter; and
providing, by the provider institution computing system, a notification to a user device associated with a user indicating that the digital object is filtered out from being associated with the card.

9. The method of claim 1, further comprising:
in response to receiving the request to associate the card with the digital object, providing, by the provider institution computing system, a notification to a user device associated with a user indicating that the digital object is undergoing a filtration process; and
associating a temporary placeholder image with the card, wherein associating the temporary placeholder image with the card comprises configuring the provider institution client application to display the temporary placeholder image to represent the card.

10. A non-transitory computer-readable medium having instructions stored thereon that, when executed by a processor of a provider institution computing system, cause operations comprising:
receiving a request to associate a card with a digital object;
generating at least one filter that defines prohibited content for card images, the at least one filter comprising a first filter;
extracting image content from the digital object;
determining that the image content satisfies the first filter;
in response to the determination that the image content satisfies the first filter, associating the digital object with the card in a database associated with the provider institution computing system;

causing a provisioning of the digital object associated with the card to a client application associated with the provider institution computing system to display the digital object as being associated with the card;

receiving a credential associated with a third-party digital platform depicting a digital representation of the card;

providing the received credential to the third-party digital platform depicting the digital representation of the card; and receiving an indication of a verification of the received credential and subsequently linking the provider institution computing system with the third-party digital platform.

11. The non-transitory computer-readable medium of claim 10, wherein the instructions further cause operations comprising:

based on the linking, receiving third-party image content associated with the card from the third-party digital platform;

comparing the third-party image content to the digital object;

determining that the third-party image content differs from the digital object; and providing the digital object that replaces the third-party image content such that the digital object is depicted in the third-party digital platform in place of the third-party image content.

12. The non-transitory computer-readable medium of claim 10, wherein the at least one filter comprises a second filter associated with the third-party digital platform, the first filter being associated with the provider institution computing system, the second filter being different from the first filter, and the instructions further cause determining that the image content satisfies the second filter.

13. The non-transitory computer-readable medium of claim 10, wherein the instructions further cause operations comprising:

determining that the card is associated with a physical card provided by a provider institution associated with the provider institution computing system; and associating the digital object with the physical card, wherein associating the digital object with the physical card comprises storing the digital object in the database of the provider institution computing system.

14. The non-transitory computer-readable medium of claim 13, wherein the at least one filter comprises a second filter associated with physical cards provided by the provider institution computing system, the first filter being associated with digital cards associated with the provider institution computing system, and the second filter being different than the first filter, wherein the instructions further cause operations comprising determining that the image content satisfies the second filter.

15. The non-transitory computer-readable medium of claim 10, wherein the prohibited content comprises at least one of explicit content and copyrighted content.

16. A mobile device, comprising:

a processor; and a memory coupled to the processor, the memory having a provider institution client application stored thereon, the provider institution client application including instructions executable by the processor to:

receive a request to associate a card with a digital object;

generate at least one filter that defines prohibited content for card images, the at least one filter comprising a first filter;

extract image content from the digital object;

determine that the image content satisfies the first filter;

in response to the determination that the image content satisfies the first filter, associate the digital object with the card in a database associated with the provider institution client application;

cause a provisioning of the digital object associated with the card to the provider institution client application to display the digital object as being associated with the card;

receive a credential associated with a third-party digital platform depicting a digital representation of the card;

provide the received credential to the third-party digital platform depicting the digital representation of the card; and receive an indication of a verification of the received credential and subsequently link the provider institution client application with the third-party digital platform.

17. The mobile device of claim 16, wherein the instructions further cause the processor to:

based on the linking, receive third-party image content associated with the card from the third-party digital platform;

compare the third-party image content to the digital object;

determine that the third-party image content differs from the digital object; and provide the digital object that replaces the third-party image content such that the digital object is depicted in the third-party digital platform in place of the third-party image content.

18. The mobile device of claim 16, wherein the prohibited content comprises at least one of explicit content and copyrighted content.

* * * * *